United States Patent
Ayaki et al.

(10) Patent No.: US 6,934,464 B1
(45) Date of Patent: Aug. 23, 2005

(54) VIDEO/AUDIO DATA RECORDING APPARATUS, VIDEO/AUDIO DATA REPRODUCING APPARATUS, VIDEO/AUDIO DATA RECORDING/REPRODUCING APPARATUS, VIDEO/AUDIO DATA RECORDING METHOD, VIDEO/AUDIO DATA REPRODUCING METHOD, AND PROGRAM RECORDING PROGRAM RECORDING MEDIUM

(75) Inventors: Yasushi Ayaki, Neyagawa (JP); Toshikazu Kodo, Nishinomiya (JP); Hiroyuki Iitsuka, Katano (JP); Satoshi Kondo, Yawata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/622,406

(22) PCT Filed: Dec. 17, 1999

(86) PCT No.: PCT/JP99/07086

§ 371 (c)(1),
(2), (4) Date: Aug. 17, 2000

(87) PCT Pub. No.: WO00/39799

PCT Pub. Date: Jul. 6, 2000

(30) Foreign Application Priority Data

Dec. 23, 1998 (JP) .................................... H 10-376589
Feb. 23, 1999 (JP) .................................... H 11-044383

(51) Int. Cl.⁷ ............................. H04N 5/91; H04N 7/04
(52) U.S. Cl. .......................... 386/95; 386/125; 386/126
(58) Field of Search ............................ 386/95, 109, 70, 386/46

(56) References Cited

U.S. PATENT DOCUMENTS

| 6,118,924 | A | * | 9/2000 | Nakatani et al. | 386/70 |
| 6,292,625 | B1 | * | 9/2001 | Gotoh et al. | 386/95 |
| 6,341,047 | B1 | * | 1/2002 | Ishii et al. | 360/72.2 |
| 6,389,223 | B1 | * | 5/2002 | Aotake | 386/109 |
| 2001/0012435 | A1 | * | 8/2001 | Kojima | 386/46 |

FOREIGN PATENT DOCUMENTS

| JP | 6-284364 | 10/1994 |
| JP | 8-287593 | 11/1996 |
| JP | 9-35411 | 2/1997 |
| JP | 9-120666 | 5/1997 |
| JP | 9-139009 | 5/1997 |
| JP | 9-168130 | 6/1997 |
| JP | 9-259578 | 10/1997 |
| JP | 10-301816 | 11/1998 |

OTHER PUBLICATIONS

JPO Office Action mailed on Dec. 2, 2003.

* cited by examiner

Primary Examiner—Thai Tran
Assistant Examiner—Alicia M Duggins
(74) Attorney, Agent, or Firm—Smith, Gambrell & Russell, LLP

(57) ABSTRACT

An interface circuit that accepts control commands for creating AV files, and a hard disk control circuit, are provided, and loop recording can be performed on the basis of an AV file. Further, in loop recording operation, a frame number of a first frame of an AV file is stored in an AV file area management table as an offset value, and a position of each frame is managed by assigning a corresponding frame number from a start of loop recording onward, thereby enabling position indication such that the record position and reproduce position increase with the passage of time, even in loop recording mode.

18 Claims, 22 Drawing Sheets

Fig. 4 (a) Data arrangement on hard disk 16

Fig. 4 (b) Conceptual diagram of data arrangement in AV file 40

40: AV file
41: Repeat recording area

Fig. 8 (a)
Data arrangement in AV file 81 when maximum size has not been reached 80 AV file maximum size 0 1 2 3 4 5

AV file 81

82 Maximum size setting command confirmation position

Fig. 8 (b)
Data arrangement on hard disk 16

0 1 2 3 4 5    6 7 8 9

43 Loop recording area start position

41 Loop recording area

42 Recording area

50 Record position

83 Maximum limit address

Fig. 9 (a)

| AV file creation command 90 | |
|---|---|
| Op code | ( 10H ) |
| Parameter 1 | AV file specification parameter |
| Parameter 2 | AV file size specification parameter |

Fig. 9 (b)

| Recording operation setting command 91 | |
|---|---|
| Op code | ( 22H ) |
| Parameter 1 | AV file specification parameter |
| Parameter 2 | Recording operation mode |

Fig. 9 (c)

| Additional recording instruction command 92 | |
|---|---|
| Op code | ( 31H ) |
| Parameter 1 | AV file specification parameter |

Fig. 9 (d)

| AV file overwrite recording command 93 | |
|---|---|
| Op code | ( 30H ) |
| Parameter 1 | AV file specification parameter |

Fig. 9 (e)

| Playback operation setting command 94 | |
|---|---|
| Op code | ( 23H ) |
| Parameter 1 | AV file specification parameter |
| Parameter 2 | Playback operation mode |

Fig. 9 (f)

| Playback instruction command 95 | |
|---|---|
| Op code | ( 38H ) |
| Parameter 1 | AV file specification parameter |

Fig. 9 (g)

| Stop command 96 | |
|---|---|
| Op code | ( 3FH ) |
| Parameter 1 | (Reserved) |

Fig. 10 (a)

| Maximum size setting command 97.98 | |
|---|---|
| Op code | ( 11H ) |
| Parameter 1 | AV file specification parameter |
| Parameter 2 | Maximum size specification parameter |

Fig. 10 (b)

| Recording operation setting command 91 | |
|---|---|
| Op code | ( 22H ) |
| Parameter 1 | AV file specification parameter |
| Parameter 2 | Recording operation mode |

Fig. 10 (c)

| Additional recording instruction command 92 | |
|---|---|
| Op code | ( 31H ) |
| Parameter 1 | AV file specification parameter |

Fig. 11

| | | |
|---|---|---|
| Field #0 | Area start position address | 112 |
| Field #1 | Area size | 113 |
| Field #2 | AV file start position address | 114 |
| Field #3 | AV file start position information | 115 |

111 AV file area management table

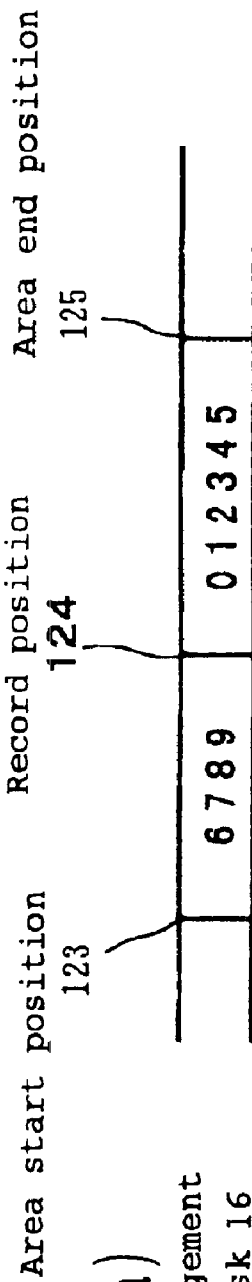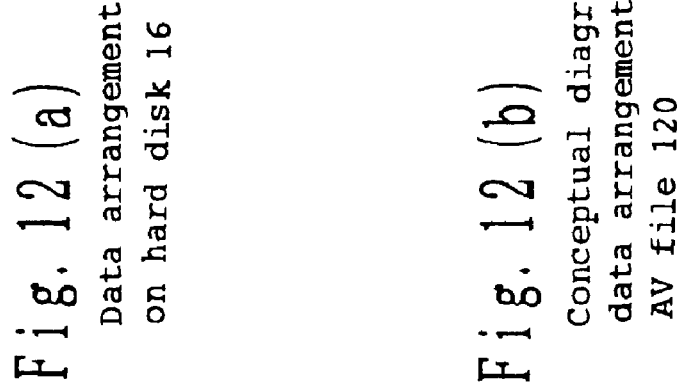

Fig. 13 (a)

| Search command 131 | |
|---|---|
| Op code | ( 10H ) |
| Parameter 1 | Virtual plug specification parameter |
| Parameter 2 | Target position information |

Fig. 13 (b)

| Position information inquiry command 132 | |
|---|---|
| Op code | ( 11H ) |
| Parameter 1 | Virtual plug specification parameter |

Fig. 13 (c)

| Record command 133 | |
|---|---|
| Op code | ( 12H ) |
| Parameter 1 | Virtual plug specification parameter |
| Parameter 2 | Recording mode specification parameter |

Fig. 13 (d)

| Playback command 134 | |
|---|---|
| Op code | ( 13H ) |
| Parameter 1 | Virtual plug specification parameter |

Fig. 13 (e)

| Stop command 135 | |
|---|---|
| Op code | ( 14H ) |
| Parameter 1 | Virtual plug specification parameter |

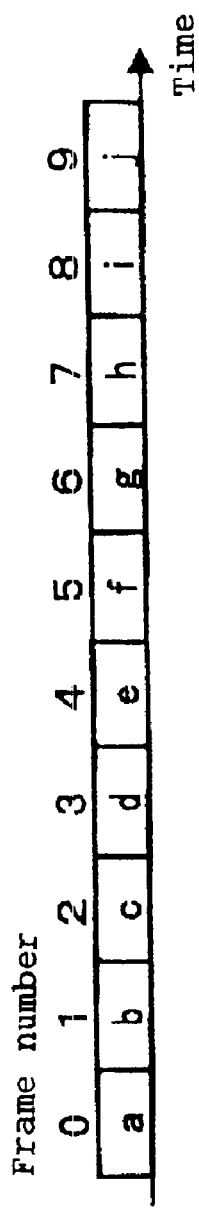
Fig. 15(a) Input AV data
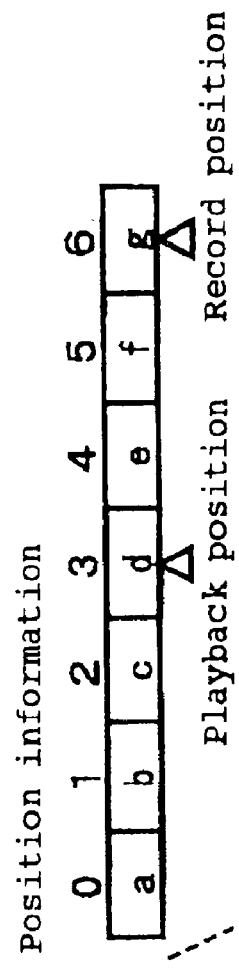
Fig. 15(b) AV file T = 6 frames
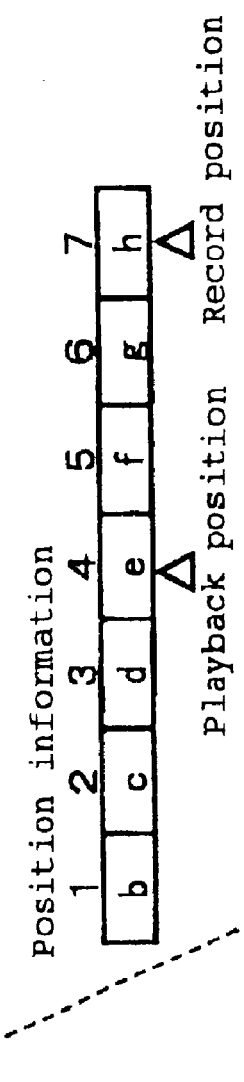
Fig. 15(c) AV file T = 7 frames
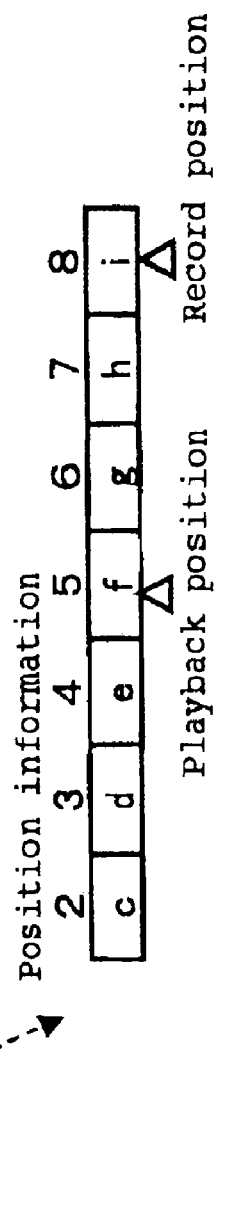
Fig. 15(d) AV file T = 8 frames

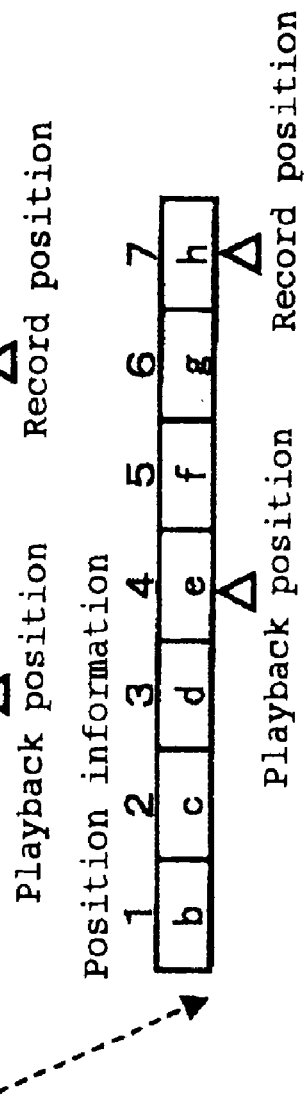
Fig. 16(a) Input AV data
Fig. 16(b) AV file T = 6 frames
Fig. 16(c) AV file T = 7 frames
Fig. 16(d) AV file After stopping recording/playback

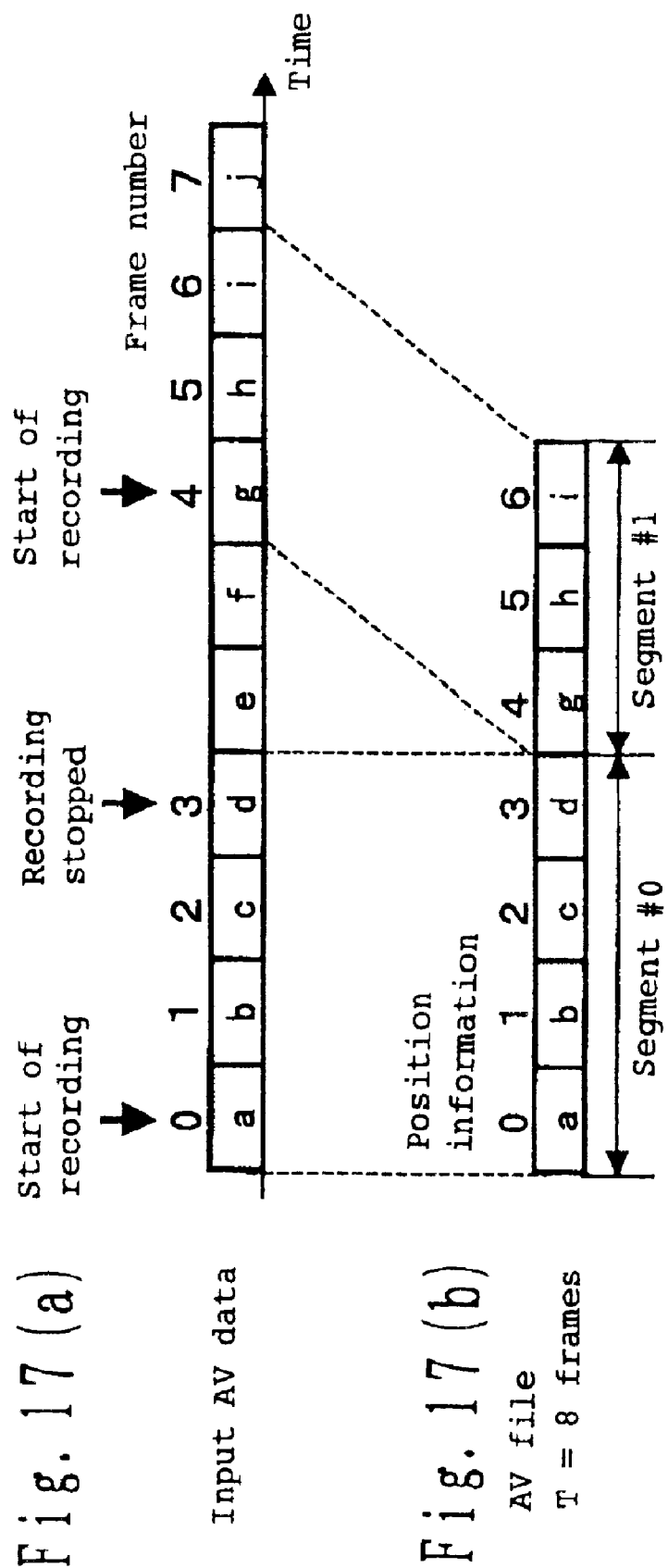
Fig. 17(a) Input AV data
Fig. 17(b) AV file T = 8 frames
Fig. 17(c) AV file T = 9 frames

Fig. 18

| | 181 AV file area management table |
|---|---|
| Field #0 | Area start position address |
| Field #1 | Area size |
| Field #2 | Number of segments (2) |
| Field #3 | Segment #0 start position address |
| Field #4 | Segment #0 size |
| Field #5 | Segment #0 start position information — 182 |
| Field #6 | Segment #1 start position address |
| Field #6 | Segment #1 size |
| Field #6 | Segment #1 start position information — 183 |

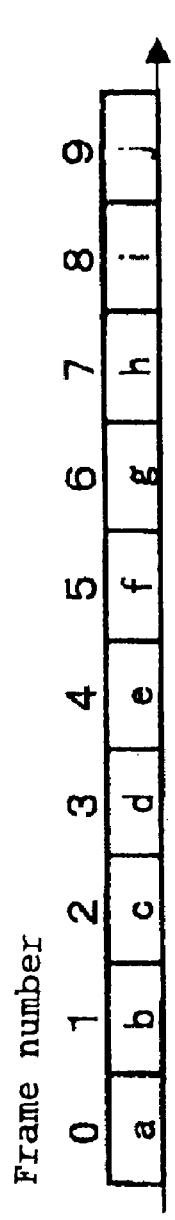
Fig. 22 (a) Input AV data
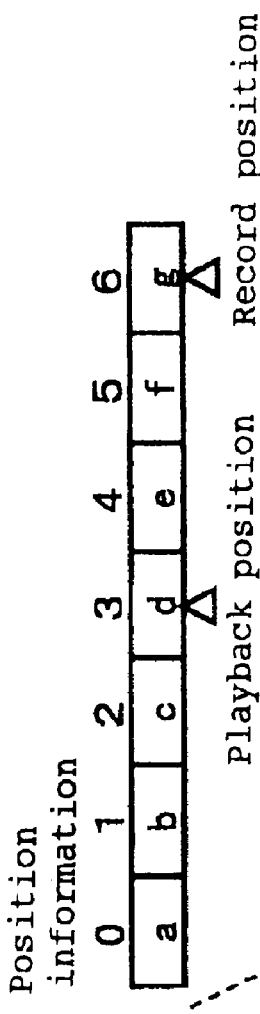
Fig. 22 (b) AV file T = 6 frames
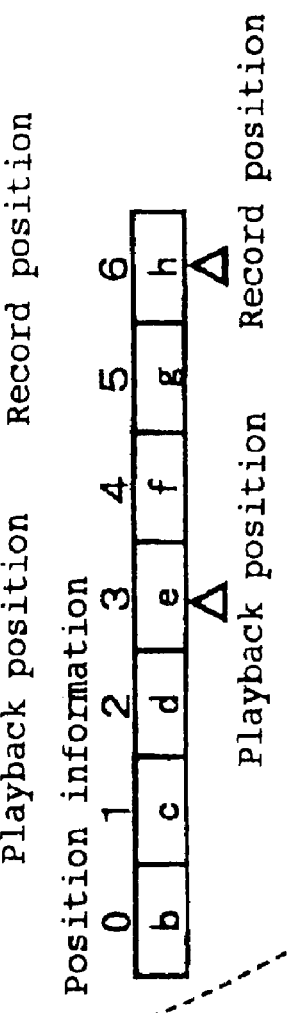
Fig. 22 (c) AV file T = 7 frames
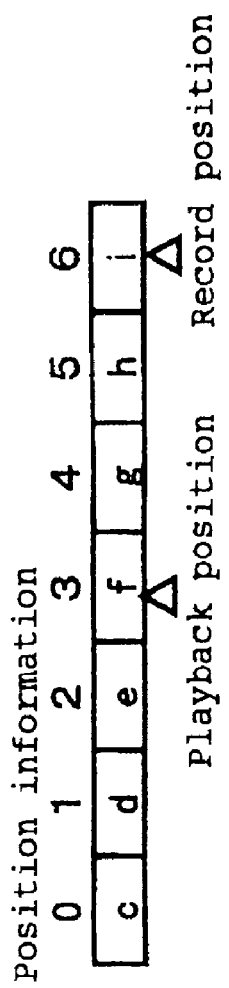
Fig. 22 (d) AV file T = 8 frames

VIDEO/AUDIO DATA RECORDING APPARATUS, VIDEO/AUDIO DATA REPRODUCING APPARATUS, VIDEO/AUDIO DATA RECORDING/REPRODUCING APPARATUS, VIDEO/AUDIO DATA RECORDING METHOD, VIDEO/AUDIO DATA REPRODUCING METHOD, AND PROGRAM RECORDING PROGRAM RECORDING MEDIUM

Audio visual data recording apparatus, audio visual data reproduce apparatus, audio visual data recording and reproduce apparatus, audio visual data recording method, audio visual data reproduce method, and medium

TECHNICAL FIELD

The present invention relates to a recording and reproduce apparatus or recording and reproduce method using a magnetic disk, and in particular relates to an audio visual data recording apparatus, audio visual data reproduce apparatus, audio visual data recording and reproduce apparatus, audio visual data recording method, audio visual data reproduce method, and medium, for recording or playing back real-time data such as AV (Audio Visual) data.

BACKGROUND ART

In recent years, the recording capacity and transfer speed of HDDs (Hard Disk Drives) have continued to improve at a rapid pace, making possible the recording and reproduce of moving-picture data, and audio visual data recording and reproduce apparatuses using HDDs have been developed.

FIG. 19 is a drawing showing a configuration of an audio visual data recording and reproduce apparatus using conventional technology. In the figure, reference numeral 190 denotes the audio visual data recording and reproduce apparatus, reference numeral 191 denotes a control circuit for performing input/output of audio visual data (AV data) with respect to the outside of the audio visual data recording and reproduce apparatus 190 and for operating each part of the audio visual data recording and reproduce apparatus 190. Reference numeral 192 denotes an actuator drive circuit, reference numeral 193 denotes buffer RAM, reference numeral 194 denotes a read/write signal processing circuit, and reference numeral 198 denotes an HDA (Head Disk Assembly) integrating a hard disk 195, head 196, and actuator 197.

As the basic operation of an audio visual data recording and reproduce apparatus using conventional technology and with this kind of configuration, AV data is recorded onto the hard disk 195 by temporarily storing AV data input via the control circuit 191 in the buffer RAM 193, and transferring it to the HDA 198.

The read/write signal processing circuit 194 detects the position of the head 196 on the hard disk 195 and transfers this to the control circuit 191. The control circuit 191 references this position signal, generates an actuator drive signal, and outputs this to the actuator drive circuit 192, whereupon the actuator drive circuit 192 outputs a drive signal to the actuator 197 inside the HDA 198. In accordance with this drive signal, the head 196 is positioned at the desired position on the hard disk 195, and AV data recording and reproduce can be performed based on a read/write control signal from the control circuit 191.

With a recording and reproduce apparatus using a hard disk, such as the above described audio visual data recording and reproduce apparatus 190, a loop recording function is implemented by using the high-speed accessibility of the hard disk (for example, Japanese Patent Laid-Open No. 9-139009 specification). A loop recording function constantly performs repeated overwriting of an image for a given time period in a prescribed area on the hard disk, thereby enabling the user to view an image back in time to a certain extent from the present time. For example, even if the record button is pressed when the scene to be recorded appears, the scene actually recorded will be delayed by around 5 to 10 seconds. Accordingly, it is useful always to record an image a little earlier than the image displayed on the screen, even if only 10 seconds or so, as described above.

In the above described audio visual data recording and reproduce apparatus 190, this kind of loop recording function is implemented by means of suitable control of the read/write signal processing circuit 194 and actuator drive circuit 192 by the control circuit 191.

On the other hand, a serial bus conforming to the IEEE (Institute of Electrical and Electronics Engineers) 1394 standard is coming into increasingly wide use as the standard interface for interconnecting general digital AV devices.

FIG. 20 is a drawing showing a configuration in which various kinds of AV devices and related devices are connected via an IEEE1394 bus. In the figure, reference number 190 denotes an audio visual data recording and reproduce apparatus; reference numeral 200 denotes a controller, implemented by means of a computer, for example; reference numeral 201 denotes a digital monitor for displaying AV data, which is digital data, as images; reference numeral 202 denotes a VTR which performs recording and reproduce AV data; reference numeral 203 denotes a tuner that selects a broadcasting station that is the AV data source, and outputs AV data; and reference numeral 204 denotes an IEEE1394 serial bus that connects the above described various devices and is used to exchange various signals comprising AV data and control commands.

As shown in FIG. 20, the various devices can exchange digital AV data, and control information such as commands controlling the connected devices, via the 1394 serial bus, and if, for example, control commands are issued using a personal computer as the controller 200, all the AV devices connected to the 1394 serial bus can be controlled by a single personal computer.

An example of the AV device control command set used on the 1394 serial bus is the AV/C (Audio Video/Control) command set. Using AV device control commands of this kind, the above described controller 200 can control the audio visual data recording and reproduce apparatus 190.

Now, conventional AV device control commands typified by the AV/C command set include, as commands that control recording and reproduce operations of the audio visual data recording and reproduce apparatus, a reproduce command to perform a reproduce operation, a record command to perform recording operation, a stop command to stop reproduce/recording operation, and a search command to change the recording or reproduce position on the hard disk.

In order to implement the previously described loop recording operation in an audio visual data recording and reproduce apparatus connected by an IEEE1394 serial bus interface, it is necessary to use a number of AV device control commands in concert.

FIG. 21 is a drawing showing the sequence of commands in the case where loop recording is performed in a prescribed area on the hard disk to enable implementation of loop recording operation using an above described conventional AV device control command set. Below, the procedure for executing loop recording operation by means of a conventional AV device control command set will be described with reference to this figure.

The controller 200 first issues a search command 213 to the audio visual data recording and reproduce apparatus 190. On receiving the search command 213, the audio visual data recording and reproduce apparatus 190 changes the AV data record position to the prescribed position on the built-in hard disk and sets up the AV data recording preparations.

Next, the controller 200 issues a video record command 214. On receiving the video record command 214, the audio visual data recording and reproduce apparatus 190 starts AV data recording from the prescribed position described above.

When the controller 200 confirms the location fixed as the end position in the prescribed area while AV data recording is being performed, it again issues a search command 213. On receiving the reissued search command 213, the audio visual data recording and reproduce apparatus 190 stops the recording operation, then returns again to a start of the prescribed recording area determined by the initial search command, and resumes the recording operation. Subsequently, recording is performed by having the controller 200 issue a search command 213 each time it confirms the prescribed last area, and performing repeated overwriting.

When the recording operation itself of the audio visual data recording and reproduce apparatus 190 is to be stopped, the controller 200 transmits a stop command 215. On receiving the stop command 215, the audio visual data recording and reproduce apparatus 190 stops the recording operation.

The procedure for implementing a loop recording function by controlling AV devices connected to an IEEE1394 serial bus by means of control commands in accordance with a conventional technology, then, is as described above. However, in this operation, the controller 200 constantly executes checks of the position of the area subject to loop recording, and issues a search command 213 numerous times in accordance with those checks, and thus a heavy load is imposed on the controller 200.

In addition, on the audio visual data recording and reproduce apparatus 190 side, since there is a time lag from reception of a search command 213 and command confirmation to the change of record position, there is a risk of gaps occurring in the AV data to be recorded.

Therefore, a function such as a loop recording function that repeatedly overwrites a given area with AV data cannot be said to be capable of being adequately implemented at the time of using a control command set in accordance with the above described conventional technology.

Further, when a recording or reproduce area of a prescribed size is designated for a specific use, as with loop recording, it is necessary to secure a recording area of the above described prescribed size on the hard disk, and to ensure that this is not used for other purposes. With an audio visual data recording and reproduce apparatus employing conventional technology, this kind of specific area is directly managed beforehand on the system side, and is differentiated from recording areas that can be used freely by the user via the controller, as with AV/C commands. That is to say, a control command for securing an area of the above described kind is not present in a conventional AV device control command set.

Thus, when an audio visual data recording and reproduce apparatus employing conventional technology is used connected to an IEEE1394 serial bus, there is a problem in that the user cannot control the loop recording function, or a function for designating a recording area flexibly according to its use, via the controller.

DISCLOSURE OF THE INVENTION

The present invention has been implemented taking into account the problems of a conventional audio visual data recording and reproduce apparatus as described above.

The 1st invention of the present invention (corresponding to claim 1) is an audio visual data recording apparatus, comprising:

a recording medium for recording video and/or audio data;

recording area recording means for performing recording of video and/or audio data in a recording area in said recording medium;

command receiving means for receiving control commands from a device connected via a bus; and AV file management means when a command that creates an AV file is received by said command receiving means for setting an AV file management table containing information on the correspondence between said recording medium recording areas and the AV file, and for creating an AV file of the prescribed size;

characterized in that said recording area recording means performs recording of video and/or audio data in said recording area on the basis of said AV file management table.

The 2nd invention of the present invention (corresponding to claim 2) is the audio visual data recording apparatus according to claim 1, characterized in that said recording area recording means performs recording of video and/or audio data by repeated overwriting in said recording area corresponding to said AV file on the basis of said AV file management table.

The 3rd invention of the present invention (corresponding to claim 4) is an audio visual data recording apparatus, comprising:

a recording medium that records video and/or audio data;

recording area recording means for performing recording of video and/or audio data in a recording area in said recording medium;

command receiving means for receiving control commands from a device connected via a bus; and AV file maximum size setting means for, when a maximum size setting command that stipulates the maximum size of an AV file is received by said command receiving means, setting said maximum size in the AV file management table, characterized in that said recording area recording means performs recording of video and/or audio data in said recording area on the basis of said AV file management table.

The 4th invention of the present invention (corresponding to claim 5) is the audio visual data recording apparatus according to claim 4, characterized in that said recording area recording means performs recording of video and/or audio data by repeated overwriting in said recording area corresponding to said AV file on the basis of the AV file maximum size in said AV file management table.

The 5th invention of the present invention (corresponding to claim 7) is an audio visual data reproduce apparatus, comprising:

a recording medium for recording video and/or audio data;

AV file management means for managing an AV file management table containing information on the correspondence between said recording medium recording areas and an AV file;

command receiving means for receiving control commands from a device connected via a bus; and reproduce means for receiving said control commands and playing back video and/or audio data recorded by the audio visual data recording apparatus according to any of claims 1 through 6, characterized in that said command receiving means receives a reproduce instruction command that performs a reproduce operation on AV file data; and said reproduce means, on reception of said reproduce instruction command, performs reproduce of video and/or audio data from said recording area on the basis of said AV file management table.

The 6th invention of the present invention (corresponding to claim 11) is an audio visual data recording and reproduce apparatus characterized by combining the audio visual data recording apparatus according to any one of claims 1 through 6, and the audio visual data reproduce apparatus according to any one of claims 7 through 10.

The 7th invention of the present invention (corresponding to claim 12) is an audio visual data recording method using:

a recording medium that records video and/or audio data;

recording area recording means for performing recording of video and/or audio data in a recording area in said recording medium;

command receiving means for receiving control commands from a device connected via a bus, and AV file management means for, when a command that creates an AV (audio visual) file is received by said command receiving means, setting an AV file management table containing information on the correspondence between said recording medium recording areas and the AV file, and creating an AV file of the prescribed size;

characterized by comprising a step of performing recording of video and/or audio data in said recording area on the basis of said AV file management table, by using said recording area recording means.

The 8th invention of the present invention (corresponding to claim 13) is an audio visual data reproduce method using:

a recording medium that records video and/or audio data;

AV file management means for managing an AV file management table containing information on the correspondence between said recording medium recording areas and an AV file;

command receiving means for receiving control commands from a device connected via a bus; and reproduce means for receiving said control commands and playing back video and/or audio data recorded by the audio visual data recording method according to claim 12, characterized by comprising a step of:

receiving a reproduce instruction command that performs a reproduce operation on AV file data by using said command receiving means; and performing reproduce of video and/or audio data from said recording area on the basis of said AV file management table by using said reproduce means on reception of said reproduce instruction command.

The 9th invention of the present invention (corresponding to claim 14) is a program recording medium characterized by recording a program for executing on a computer all or some of the functions of each step or each part of the audio visual data recording apparatus according to any one of claims 1 through 6.

The 10th invention of the present invention (corresponding to claim 16) is a program recording medium characterized by recording a program for executing on a computer all or some of the steps of the operation of the audio visual data recording method according to claim 12.

The audio visual data recording and reproduce apparatus of the present invention makes it possible to provide a prescribed area that can be designated arbitrarily by the user in a recording area, and also makes possible control of recording operations, and enables overwrite recording such as prerecording to be performed continuously.

The 11th invention of the present invention (corresponding to claim 18) is an audio visual data recording and reproduce apparatus, comprising:

recording means for recording input AV data blocks as an AV file;

reproduce means for playing back AV data blocks recorded in an AV file:

AV file specification means for specifying an AV file;

record/reproduce position specification means for specifying the record/reproduce position in an AV file;

position information management means for assigning correspondence of absolute position information, whereby position information does not change as recording progresses, to each AV data block when sequentially input AV data blocks are recorded in an AV file, and recording and managing this as position information; and record/reproduce position setting means for, when a record/reproduce position is specified by said record/reproduce position specification means, finding the AV data block matching said specified position, on the basis of said position information managed by said position information management means, in the AV file specified by said AV file specification means, and setting the record/reproduce position to that block;

characterized in that said recording means or reproduce means performs recording or reproduce with the record/reproduce position set by said record/reproduce position setting means in the specified AV file as the starting point.

The 12th invention of the present invention is an audio visual data recording and reproduce apparatus, comprising:

recording means for recording input AV data blocks as an AV file;

reproduce means for playing back AV data blocks recorded in an AV file:

AV file specification means for specifying an AV file;

record/reproduce position specification means for specifying the record/reproduce position in an AV file;

position information management means that has a first position information management method of assigning correspondence of absolute position information, the content of which does not change as recording progresses, to each AV data block when sequentially input AV data blocks are recorded in an AV file, and recording and managing this as position information; and a second position information management method of managing relative position information, with a given position in said AV file as the starting point, as position information for each AV data block; and that can switch said two methods according to the recording/reproduce operation mode; and record/reproduce position setting means, when a record/reproduce position is specified by said record/reproduce position specification means, for finding the AV data block matching said specified position, on the basis of said position information corresponded by said position information management means, in the AV file specified by said AV file specification means, and for setting the record/reproduce position to that block;

characterized in that said recording means or reproduce means performs recording or reproduce with the record/reproduce position set by said record/reproduce position setting means in the specified AV file as the starting point.

BRIEF DESCRIPTION OF THE DRAWINGS

FIGS. 8(a) and 8(b) show a drawing showing a relationship between the hard disk 16 and an AV file when prerecording operation is performed in an audio visual data recording and reproduce apparatus according to embodiment 2 of the present invention;

FIGS. 9(a) to (g) are drawings showing formats of control commands that are received by an audio visual data recording and reproduce apparatus 10 according to embodiment 1 of the present invention, and that execute instructions contained therein;

FIGS. 10(a) to (c) are drawings showing formats of control commands that are received by an audio visual data recording and reproduce apparatus 10 according to embodiment 2 of the present invention, and that execute instructions contained therein;

FIG. 11 is a configuration diagram of an AV file area management table in embodiment 3 of the present invention;

FIGS. 12(a) and 12(b) show a relationship between the data arrangement on the hard disk and the data arrangement on an AV file in case of loop recording operation in embodiment 3 of the present invention;

FIGS. 13(a) and 13(e) show formats of control commands that are received by an audio visual data recording and reproduce apparatus according to embodiment 3 of the present invention, and that execute instructions contained therein;

FIGS. 15(a) and 15(d) show changes over time in the configuration of recorded data in an AV file and in the position information when loop recording operation is performed in embodiment 3 of the present invention;

FIGS. 16(a) and 16(d) show the correspondence between the AV file internal recorded data configuration and position information when loop recording operation is performed, and after loop recording operation and reproduce operation have stopped, in embodiment 4 of the present invention;

FIGS. 17(a) and 17(c) show the correspondence between the AV file internal recorded data configuration and position information when loop recording operation is interrupted and restarted, in embodiment 5 of the present invention;

FIG. 18 is a configuration diagram of the AV file area management table in embodiment 5 of the present invention;

FIGS. 22(a) and 22(d) show changes over time in the configuration of recorded data in an AV file and in the position information when management is performed by means of relative position information during loop recording operation.

BEST MODE FOR CARRYING OUT THE INVENTION

Embodiments will be described below.

(Embodiment 1)

Figure 1:
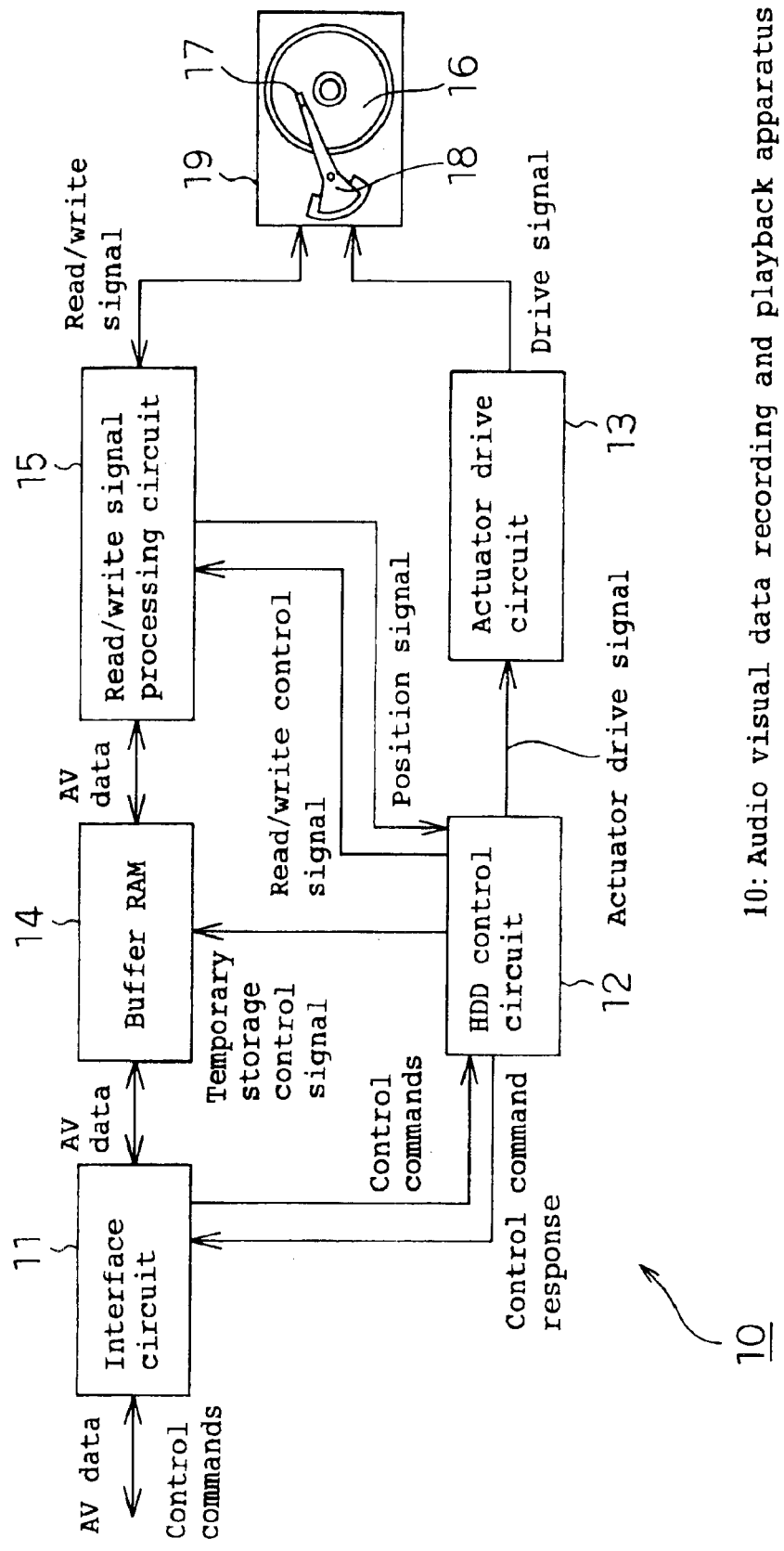
FIG. 1 is a drawing showing a configuration of an audio visual data recording and reproduce apparatus of the present invention.

FIG. 1 is a drawing showing a configuration of an audio visual data recording and reproduce apparatus according to embodiment 1 of the present invention. In the figure, reference numeral 10 denotes the audio visual data recording and reproduce apparatus.

Also, in the audio visual data recording and reproduce apparatus 10, reference numeral 11 denotes an interface circuit that receives input of control commands input from outside the audio visual data recording and reproduce apparatus 10 and performs input/output of audio visual data (AV data); reference numeral 12 denotes an HDD control circuit that receives control commands from the interface circuit 11 and operates each part of the audio visual data recording and reproduce apparatus 10; reference numeral 13 denotes an actuator drive circuit; reference numeral 14 denotes buffer RAM; and reference numeral 15 denotes a read/write signal processing circuit. Reference numeral 19 denotes an HDA integrating a hard disk 16, head 17, and actuator 18.

Except for the configuration of the interface circuit 11 and the HDD control circuit 12, the configuration and operation of the other parts are the same as for the audio visual data recording and reproduce apparatus 190 according to the conventional technology.

Figure 2:
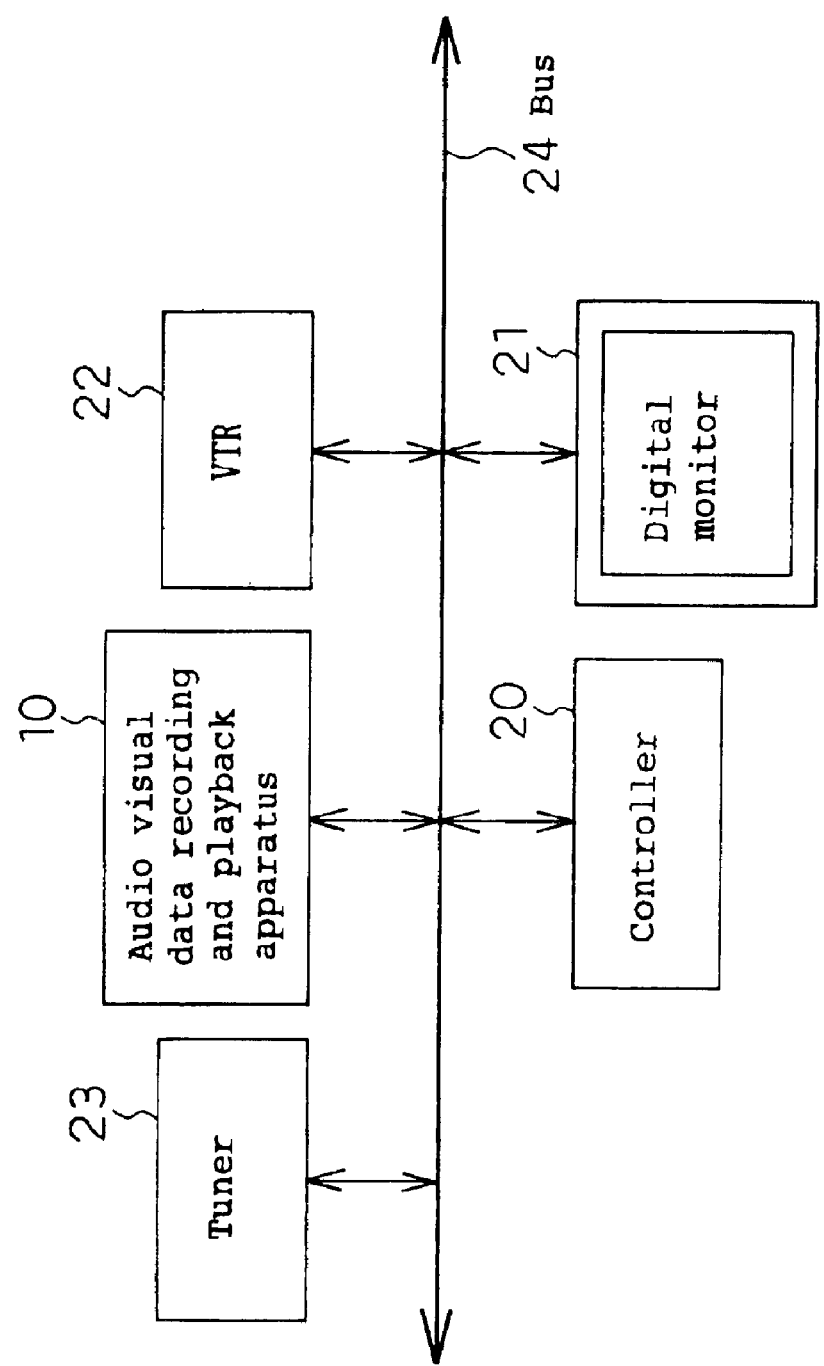
FIG. 2 is a drawing showing a situation in which the audio visual data recording and reproduce apparatus of the present invention configures a system together with other devices.

FIG. 2 is a drawing showing the situation in which an audio visual data recording and reproduce apparatus according to embodiment 1 of the present invention configures a system together with other digital devices. In the figure, reference numeral 20 denotes a controller that controls the audio visual data recording and reproduce apparatus 10 and the other connected devices; reference numeral 21 denotes a digital monitor for image output of AV data, which is digital data; reference numeral 22 denotes a VTR that performs AV data recording and reproduce; reference numeral 23 denotes a tuner for receiving digital broadcast data, which is an AV data resource; and reference numeral 24 denotes a bus for exchanging various signals comprising AV data, control commands and the like, which in this example is an IEEE1394 bus.

FIGS. 9(a) to (g) are drawings showing the formats of each control command that is received by the audio visual data recording and reproduce apparatus 10 according to embodiment 1 of the present invention, and that execute instructions contained therein. With reference to the figure, the control commands and the operations executed by each control command will be described below.

First, FIG. 9(a) shows the AV file creation command 90. This has an AV file specification parameter as parameter 1, and an AV file size specification parameter as parameter 2. The AV file specification parameter sets alternate data when transmitted from the controller 20 to the audio visual data recording and reproduce apparatus 10, and when a response is obtained, the AV file specification parameter assigned from the audio visual data recording and reproduce apparatus 10 is reported. The created AV file is accessed by means of this AV file specification parameter.

On receiving an AV file creation command, the HDD control circuit 12 creates an AV file of the size specified by parameter 2, and stores information on that AV file.

Next, FIG. 9(b) shows the recording operation setting command 91. The recording operation setting command selects the recording operation when the entire AV file is overwritten. The recording operation setting command 91 has an AV file specification parameter as parameter 1, and the recording operation mode as parameter 2. The parameter 2 recording operation mode is further divided into overwrite mode and stop mode.

On receiving a recording operation setting command, the HDD control circuit 12 stores the recording operation mode specified by parameter 2 for the specified AV file.

Next, FIG. 9(c) shows the additional recording instruction command 92. The additional recording instruction command 92 has an AV file specification parameter as parameter 1.

On receiving an additional recording instruction command 92, the HDD control circuit 12 starts additional recording of data in the specified AV file. The size of the AV file gradually increases as data is recorded.

Next, FIG. 9(d) shows the AV file overwrite recording command 93. The AV file overwrite recording command 93 has an AV file specification parameter as parameter 1.

On receiving an AV file overwrite recording command 93, the HDD control circuit 12 starts overwrite recording of data in the specified AV file, and overwrites data sequentially in the AV file. Also, when the entire AV file has been overwritten, the HDD control circuit 12 selects the set recording operation mode. If overwrite mode is specified, data is overwritten sequentially starting with the data recorded earliest; if stop mode is specified, the recording operation is discontinued.

Next, FIG. 9(e) shows the reproduce operation setting command 94. The reproduce operation setting command 94 sets the reproduce operation mode when reproduce of an area that has not been overwritten on the created AV file is specified. The reproduce operation mode is divided into alternate data reproduce mode and stop mode. The reproduce operation setting command has an AV file specification parameter as parameter 1, and the reproduce operation mode as parameter 2. On receiving a reproduce operation setting command 94, the HDD control circuit 12 records the reproduce operation mode specified by parameter 2.

Next, FIG. 9(f) shows the reproduce instruction command 95. The reproduce instruction command 95 has an AV file specification parameter as parameter 1.

On receiving a reproduce instruction command 95, the HDD control circuit 12 controls reproduce of the specified AV file.

Lastly, FIG. 9(g) shows the stop command 96. The stop command 96 has no parameters (reserved). On receiving a stop command 96, the HDD control circuit 12 terminates recording operation and reproduce operation.

The operation of an audio visual data recording and reproduce apparatus 10 according to embodiment 1 of the present invention that has the above kind of configuration will be described below.

Figure 3:
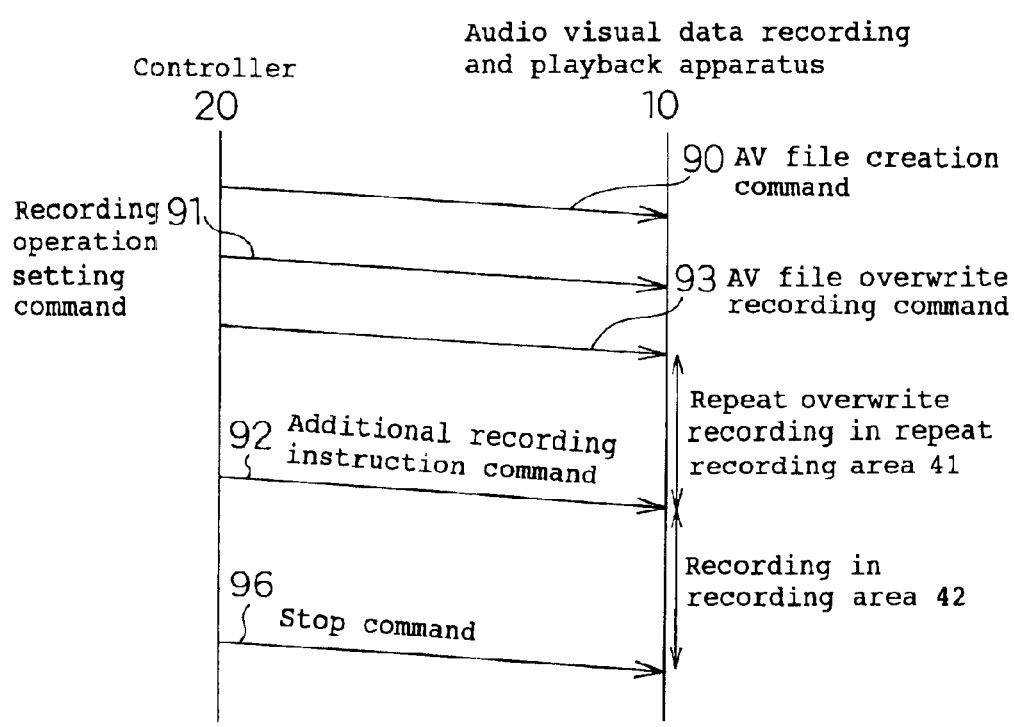
FIG. 3 is a drawing showing a sequence of control commands from a controller 20 to an audio visual data recording and reproduce apparatus 10 when prerecording operation is performed in an audio visual data recording and reproduce apparatus according to embodiment 1 of the present invention.
Figure 4:
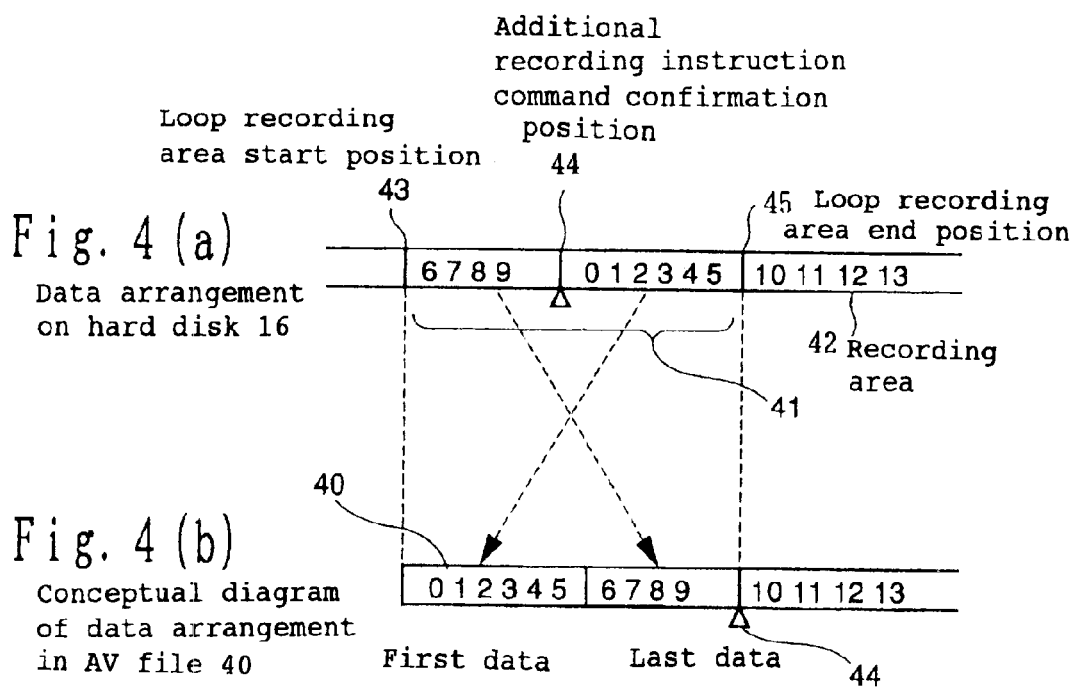
FIGS. 4a and 4(b) show a relationship between a hard disk 16 and an AV file when prerecording operation is performed in an audio visual data recording and reproduce apparatus according to embodiment 1 of the present invention.
Figure 5:
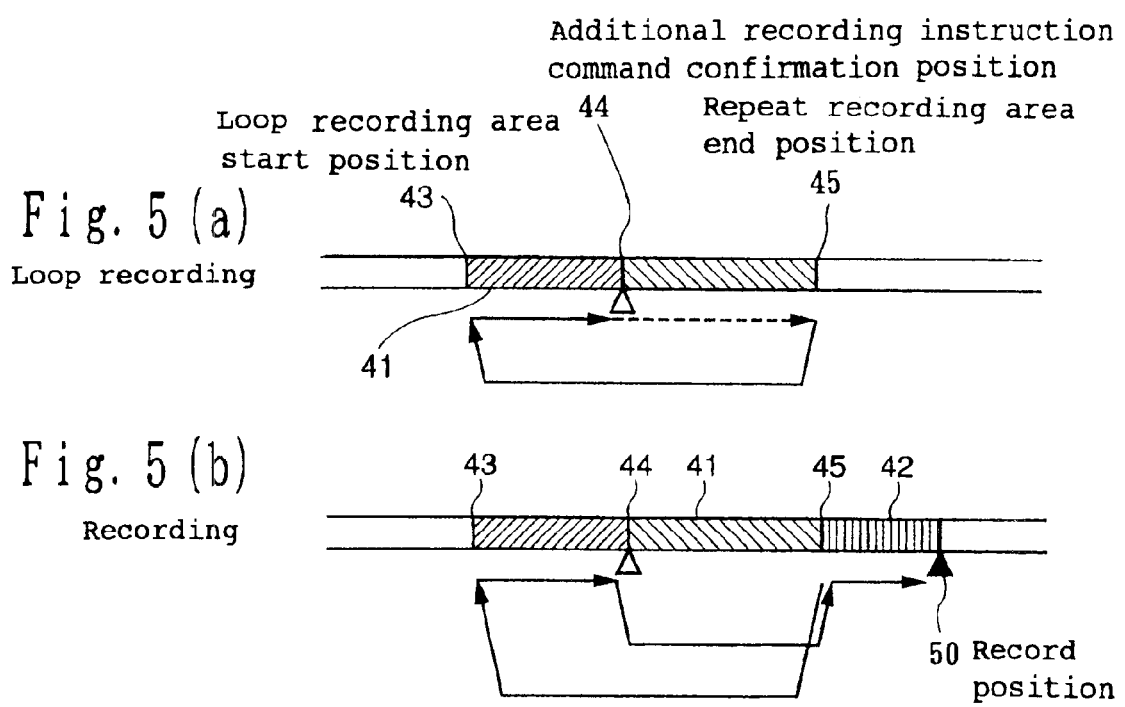
FIGS. 5(a) and 5(b) show a AV data arrangement in an overwrite recording state constituting prerecording and an additional recording state constituting normal recording overlap, on the hard disk 16 in an audio visual data recording and reproduce apparatus according to embodiment 1 of the present invention.

First, prerecording operation by the audio visual data recording and reproduce apparatus 10 will be described with reference to FIG. 3 through FIG. 5. FIG. 3 is a drawing showing the sequence of each control command from the controller 20 to the audio visual data recording and reproduce apparatus 10 when prerecording operation is performed. FIG. 4 is a drawing showing the relationship between the hard disk 16 and an AV file when prerecording operation is performed in embodiment 1. FIG. 5 is a drawing showing the AV data arrangement when the overwrite recording state constituting prerecording and the additional recording state corresponding to normal recording overlap, on the hard disk 16.

The relationship between the data arrangement on the hard disk 16 and the AV data arrangement shown in FIG. 4 is stored as an AV file management table, and management is performed, by the HDD control circuit 12.

As shown in FIG. 3, when an AV file creation command 90 is issued from the controller 20, in the audio visual data recording and reproduce apparatus 10 the interface circuit 11 receives the AV file creation command 90, and transfers it to the HDD control circuit 12. The HDD control circuit 12 creates a new AV file 40 of the size specified by parameter 2, the AV file size specification parameter.

At this point, the AV file 40 is set as a loop recording area 41 on the hard disk 16, as shown in FIG. 4(a) and FIGS. 5(a) and (b).

Next, the controller 20 issues a recording operation setting command 91. When the recording operation setting command 91 is received by the audio visual data recording and reproduce apparatus 10, the HDD control circuit 12 sets the operation mode specified by parameter 2—here, overwrite mode—for the AV file 40.

Also, the controller 20 issues an AV file overwrite recording command 93. When the audio visual data recording and reproduce apparatus 10 receives the AV file overwrite recording command 93, the HDD control circuit 12 starts overwrite recording on the AV file 40.

On the hard disk 16, the above described overwrite recording on the AV file 40 is implemented as AV data recording in the section from the loop recording area start position 43 to the loop recording area end position 45, comprising the loop recording area 41, as shown in FIG. 4(a) and FIG. 5(a). When AV data recording is performed as far as the loop recording area end position 45, the record position returns again to the loop recording area start position 43, recording is performed by repeated overwriting, and repeated overwrite operations are performed subsequently.

Next, when normal video recording is to be performed according to the wishes of the user, the above described repeat overwrite mode is terminated, and additional recording operation is executed. The operation of the audio visual data recording and reproduce apparatus 10 in order to execute this additional recording operation is as follows. The controller 20 issues an additional recording instruction command 92 to the audio visual data recording and reproduce apparatus 10. In the audio visual data recording and reproduce apparatus 10, when the additional recording instruction command 92 is transferred from the interface circuit 11, the HDD control circuit 12 starts additional recording of new data in the repeat-overwrite-recorded AV file 40 (see FIG. 4(b)).

To describe the above described additional recording on the AV file 40 from the hard disk 16 side, first, as shown in FIG. 5(a), when reception of an additional recording instruction command 92 is confirmed during overwrite recording of the loop recording area 41, the position at that point in time is fixed as the additional recording instruction command confirmation position 44. Next, the record position—that is, the recording head of the hard disk 16 moves immediately to the loop recording area end position 45, and AV data recording is restarted on the recording area following that position. As shown in FIG. 5(b), the recording area 42 on which additional recording is performed extends up to the record position 50 with the loop recording area end position 45 as the starting point, and does not overlap the recording area 41, so that the loop recording area 41 is retained as a prerecorded recording area.

Lastly, when terminating the recording operation itself, the controller 20 issues a stop command 96 to the audio visual data recording and reproduce apparatus 10. On the audio visual data recording and reproduce apparatus 10 side, when the HDD control circuit 12 receives the stop command 96, it terminates the recording operation.

Next, reproduce operation of an audio visual data recording and reproduce apparatus according to embodiment 1 will be described with reference to FIG. 6.

Figure 6:
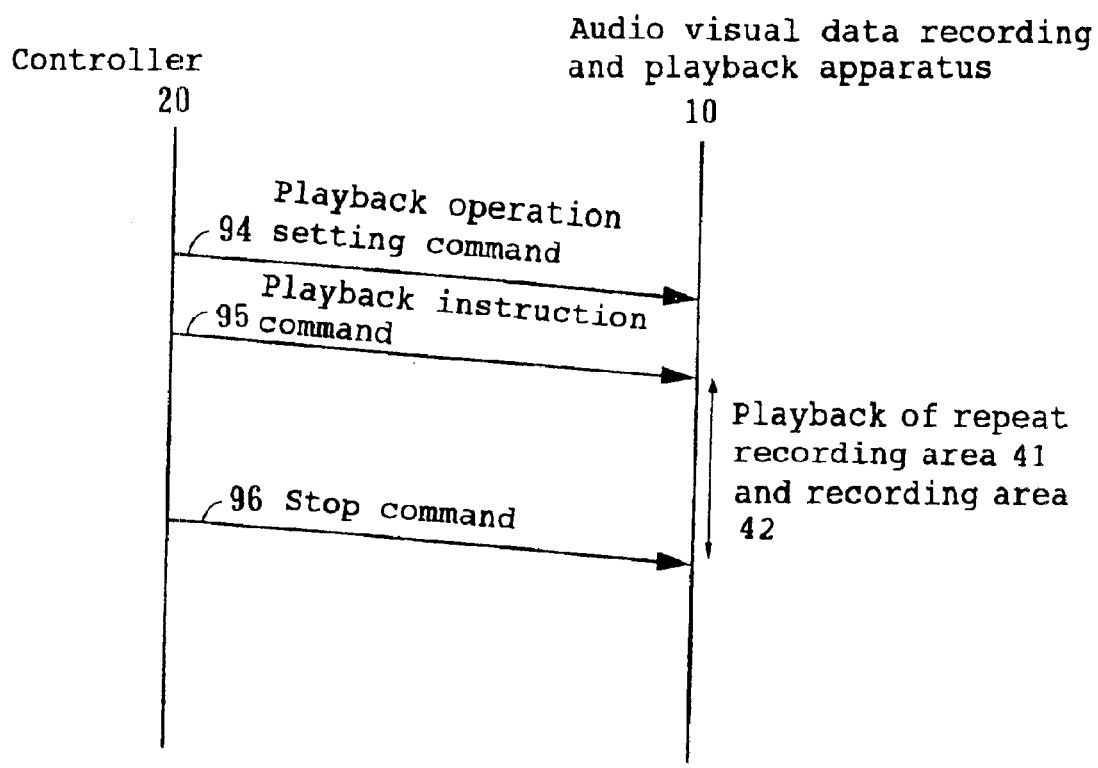
FIG. 6 is a drawing showing a sequence of various kinds of commands issued from the controller 20 to the audio visual data recording and reproduce apparatus 10 when AV data is played back by means of a management table in an audio visual data recording and reproduce apparatus according to embodiment 1 of the present invention.

FIG. 6 is a drawing showing the sequence of various kinds of commands issued from the controller 20 to the audio visual data recording and reproduce apparatus 10 when AV data is played back on the basis of an AV file.

As shown in the figure, the controller 20 issues a reproduce operation setting command 94 to the audio visual data recording and reproduce apparatus 10. On the audio visual data recording and reproduce apparatus 10 side, when the HDD control circuit 12 receives the reproduce operation setting command 94, it sets the reproduce operation mode specified by parameter 2 for the specified AV file (in this case, AV file 40).

Next, the controller 20 issues a reproduce instruction command 95 to the audio visual data recording and reproduce apparatus 10. On the audio visual data recording and reproduce apparatus 10 side, when the HDD control circuit 12 receives the reproduce instruction command 95, it starts reproduce of the AV file 40.

On the hard disk 16, AV file 40 reproduce here consists of playing back the loop recording area 41 and the recording area 42, as shown in FIG. 4(a). As repeat overwrite recording has been performed in the loop recording area 41, the AV data is not necessarily recorded in time series form, but since the AV file 40 shown in FIG. 4(b) has been set so that AV data is played back starting from data recorded longer ago along the time axis, the AV data is played back as in normal reproduce operation.

Lastly, when terminating the reproduce operation itself, the controller 20 issues a stop command 96 to the audio visual data recording and reproduce apparatus 10. On the audio visual data recording and reproduce apparatus 10 side, when the HDD control circuit 12 receives the stop command 96, it terminates the reproduce operation.

Also, if the controller 20 issues a reproduce instruction command 95 for an area that has not been overwritten in the AV file—that is, an area in which AV data has not been recorded in the loop recording area 41 or the recording area 42 on the hard disk 16—the prescribed image data (for example, a blue-background image) is played back in the case of alternate data reproduce mode, or the reproduce operation itself is terminated in the case of stop mode, according to the parameter 2 reproduce operation mode set by the reproduce operation setting command 94.

(Embodiment 2)

Next, an audio visual data recording and reproduce apparatus according to embodiment 2 of the present invention will be described. The configuration of an audio visual data recording and reproduce apparatus 10 according to embodiment 2 is identical to that of embodiment 1, but a different AV file is created and different operations performed from those in embodiment 1 by means of control commands issued from the controller 20.

FIGS. 10(a) to (c) are drawings showing the formats of control commands that are received by an audio visual data recording and reproduce apparatus 10 according to embodiment 2 of the present invention, and that execute instructions contained therein. With reference to the figures, each control command and the operations executed by each control command will be described below.

First, FIG. 10(a) shows the maximum size setting command 97/98, which sets the maximum size for an AV file. The maximum size setting command 97/98 has an AV file specification parameter as parameter 1, and a maximum size specification parameter as parameter 2.

On receiving a maximum size setting command 97/98, the HDD control circuit 12 stores the maximum size specified by parameter 2 as management information for the specified AV file. If the maximum size specification is invalidated, the maximum size is canceled.

FIG. 10(b) shows the recording operation setting command 91, and FIG. 10(c) shows the additional recording instruction command, both of which have the same function as in embodiment 1.

The audio visual data recording and reproduce apparatus 10 according to embodiment 2 also uses the reproduce instruction command 95 shown in FIG. 9(f) and the stop command 96 shown in FIG. 9(g).

The operation of an audio visual data recording and reproduce apparatus 10 according to embodiment 2 of the present invention that has the above kind of configuration will be described below.

Figure 7:
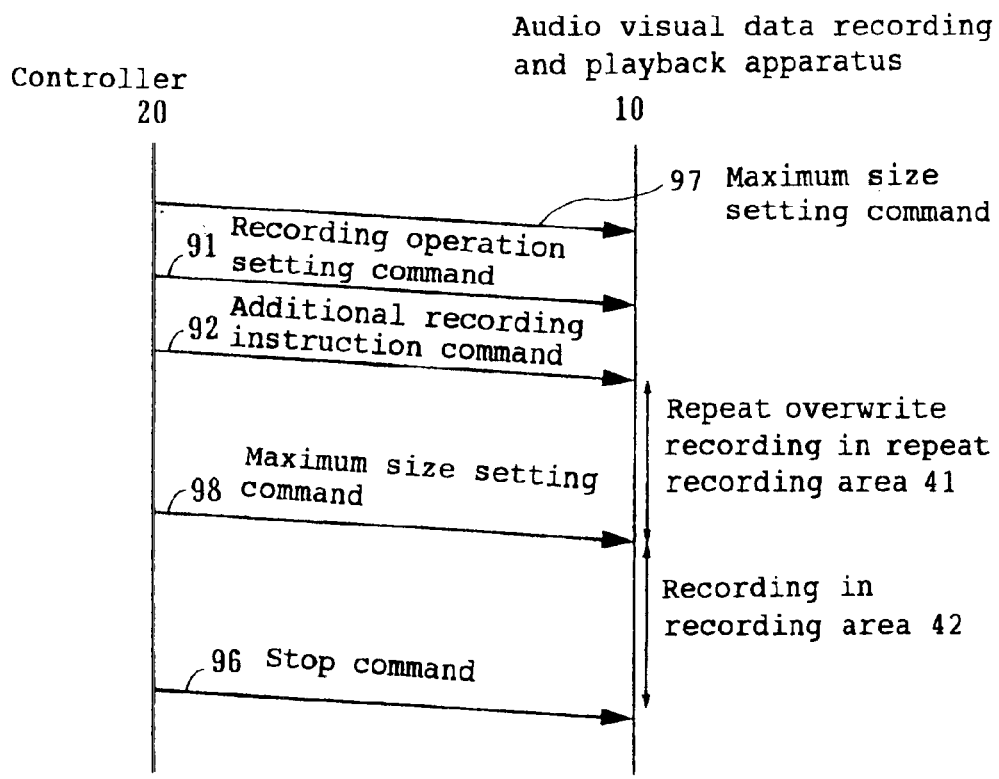
FIG. 7 is a drawing showing a sequence of control commands from the controller 20 to the audio visual data recording and reproduce apparatus 10 when prerecording operation is performed in an audio visual data recording and reproduce apparatus according to embodiment 2 of the present invention.

First, prerecording operation by the audio visual data recording and reproduce apparatus 10 will be described with reference to FIG. 7 and FIG. 8. FIG. 7 is a drawing showing the sequence of each control command from the controller 20 to the audio visual data recording and reproduce apparatus 10 when prerecording operation is performed. FIG. 6 is a drawing showing the relationship between the AV data arrangement on the hard disk 16 and the data arrangement of an AV file when prerecording operation is performed in embodiment 2.

As in embodiment 1, the relationship between the data arrangement on the hard disk 16 and the AV data arrangement shown in FIG. 8 is stored as an AV file management table, and management is performed, by the HDD control circuit 12.

As shown in FIG. 7, when a maximum size setting command 97 is issued from the controller 20, in the audio visual data recording and reproduce apparatus 10 the interface circuit 11 receives the maximum size setting command 97, and transfers it to the HDD control circuit 12. The HDD control circuit 12 sets the maximum size 80 specified by parameter 2 for the specified AV file 81.

At this time, as shown in FIG. 8(b), the AV file 81 is set as a loop recording area 41 on the hard disk 16. However, unlike the loop recording area 41 of embodiment 1, although the loop recording area start position 43 is fixed, no setting is made for the record position corresponding to the loop recording area end position 45, and the size of the loop recording area 41 is determined as a variable in the setting stage. Meanwhile, a latent loop recording area set in accordance with the maximum size 80 is determined by the loop recording area start position 43 and the maximum limit address 83.

Next, the controller 20 issues a recording operation setting command 91. When the recording operation setting command 91 is received by the audio visual data recording and reproduce apparatus 10, the HDD control circuit 12 sets the operation mode specified by parameter 2—here, overwrite mode—for the AV file 81.

Also, the controller 20 issues an additional recording instruction command 92. When the audio visual data recording and reproduce apparatus 10 receives the additional recording instruction command 92, the HDD control circuit 12 starts additional recording in the AV file 81 specified by parameter 1.

On the hard disk 16, this additional recording operation in the AV file 81 is implemented as AV data recording performed from the starting point of the loop recording area 41, as shown in FIG. 8(b).

As the data recording amount increases as the result of a recording operation by means of the above described additional recording instruction command 92, the size of the AV file 81 increases and the loop recording area 41 on the hard disk 16 similarly grows larger. When the size of the AV file 81 reaches the maximum size 80 set by the maximum size setting command 97, the HDD control circuit 12 continues overwriting from the data with the oldest recording time in the AV file, in accordance with overwrite mode—the set recording operation mode—and repeat overwrite recording mode is established.

On the hard disk 16, the above described repeat overwrite recording on the AV file 81 is implemented as AV data recording in the section from the loop recording area start position 43 to the maximum limit address 83, comprising the loop recording area 41, as shown in FIG. 8(b). When AV data recording is performed as far as the maximum limit address 83, the record position returns again to the loop recording area start position 43, and recording is performed by repeated overwriting in the loop recording area 41.

Next, when normal video recording is to be performed according to the wishes of the user, the above described repeat overwrite mode is terminated, and normal recording operation is executed. The operation of the audio visual data recording and reproduce apparatus 10 in order to execute this normal recording operation is as follows. The controller 20 issues a maximum size setting command 98 to the audio visual data recording and reproduce apparatus 10.

This maximum size setting command 98 has a different parameter 2—maximum size specification parameter—from that of the previously received maximum size setting command 97, having contents that invalidate the maximum size 80. Therefore, the AV file 81 management table is set again based on the new maximum size setting command—maximum size setting command 98—and at the same time the maximum size 80 is canceled, and the recording area size limit is eliminated.

In the management table 81, the position at the point in time at which reception of the above described maximum size setting command 98 is confirmed is fixed as the maximum size setting command confirmation position 82, and normal recording operation is started with this maximum size setting command confirmation position 82 as the starting point (see FIG. 8(a)).

To describe the above described normal recording corresponding to the management table 81 from the hard disk 16 side, first, as shown in FIG. 8(b),when reception of a maximum size setting command 98 is confirmed during overwrite recording of the loop recording area 41, the position at that point in time is fixed as the maximum size setting command confirmation position 82, the recording head of the hard disk 16 moves immediately to the maximum limit address 83, and AV data recording is executed on the recording area following that position.

As shown in the same figure, the recording area 42 on which normal recording is performed extends up to the record position 50 with the maximum limit address 83 as the starting point, and the loop recording area 41 extends from the loop recording area start position 43 to the maximum limit address 83. Therefore, the loop recording area 41 and the recording area 42 are divided with the maximum limit address 83 as the boundary, and the loop recording area 41 is retained as a prerecorded recording area.

Lastly, when terminating normal recording operation, the controller 20 issues a stop command 96 to the audio visual data recording and reproduce apparatus 10. On the audio visual data recording and reproduce apparatus 10 side, when the HDD control circuit 12 receives the stop command 96, it terminates the recording operation.

As described above, according to an audio visual data recording and reproduce apparatus of embodiment 1 or embodiment 2, it is possible for the user to set up a prescribed area, that can be set arbitrarily, in a recording area, and for recording operations to be controlled, and repeat overwrite recording such as prerecording to be performed.

Further, in embodiments 1 and 2, the descriptions covered the case where repeat overwrite recording comprises prerecording operations and normal recording in which recording is performed only once; but it is also possible for all recording areas to be made loop recording areas for performing prerecording operations, in which case endless recording is possible, enabling use of the present invention for security surveillance cameras, for example.

(Embodiment 3)

The configuration of the audio visual data recording and reproduce apparatus in the present embodiment is identical to the configuration of the audio visual data recording and reproduce apparatus in embodiments 1 and 2 shown in FIG. 1.

Now, for position information management for AV data in an AV file, a configuration is possible whereby management is performed by means of relative position information based on the start of the AV file.

The case where the position of AV data in an AV file is managed by means of relative position information in loop recording mode will be described below, using FIG. 22.

FIG. 22 shows changes in position information when the position of each frame in an AV file being recorded in loop recording mode is managed by means of information on the relative position from the start, with the start of the AV file as frame 0. As shown in FIG. 22(b) through (d), when new frame data is input during loop recording, the frame at the start of the AV file is deleted, and at the same time the input frame data is added after the last frame of the AV file, and becomes the new last frame.

As described above, when management is performed by means of relative position information in loop recording mode, position information for a given frame varies as recording progresses. That is, the frame contents and its position information change—to take the example of c, from 2 to 1 to 0, in that order.

Also, since the record position is always the last frame of the AV file, it is a fixed value and does not change. The standard speed reproduce position is also a fixed value and does not change. Therefore, it is not possible to judge from record/reproduce position information whether recording/reproduce is in progress or is halted.

Thus, in the audio visual data recording and reproduce apparatus in the present embodiment, with regard to the file management method and AV file internal AV data position information management method, the position information management method in loop recording mode employs absolute position information such that the position information for given image data does not vary.

FIG. 11 is a drawing showing the relationship between the AV data recording area on the hard disk 16 and the AV file, and the AV file area management table that manages position information for AV data in the AV file, in the present embodiment.

In FIG. 11, the AV file area management table 111 holds area management information for each AV file, with the area management information comprising the area start position address 112, area size 113, AV file start position address 114, and AV file start position information 115. The AV file start position information 115 holds the offset value of position information at the start of the AV file.

FIG. 12 is a drawing showing the relationship between a data area on the hard disk 16 and an AV file, managed by the above described AV file area management table. FIG. 12(a) shows the data arrangement in the data area 121 on the hard disk 16, and FIG. 12(b) shows the data arrangement in the AV file 120.

The relationship between the data area 121 and AV file 120 in FIG. 12 is managed by means of the area start position 123, area end position 125, and AV file start position 124. Address information on the hard disk 16 corresponding to each position is stored as the above described AV file area management table 111, and management is performed, by the HDD control circuit 12.

FIG. 13(a) through (e) are drawings showing the formats of control commands that are received by an audio visual data recording and reproduce apparatus 10 according to the present embodiment, and that execute instructions contained therein. In FIG. 13, the op code is a type code that indicates the command type, and parameters 1 and 2 are control parameters that are specified when a control command is executed.

With reference to the figures, the control commands and the operations executed by each control command will be described below.

First, FIG. 13(a) shows the search command 131. The search command 131 has a virtual plug specification parameter as parameter 1, and target position information as parameter 2.

on receiving a search command 131, the HDD control circuit 12 sets the record/reproduce position to the specified target position for the specified virtual plug. In the target position information, the AV file set as the search object and the record/reproduce position in the AV file are specified.

The virtual plugs mentioned here are input/output plugs set virtually inside a device. The audio visual data recording and reproduce apparatus 10 of the present embodiment has one input plug and one output plug, and recording and reproduce can be specified simultaneously for the hard disk using these two virtual plugs. AV data output or input from a virtual plug is actually output or input from the audio visual data recording and reproduce apparatus 10 using interface circuit 11 time division.

Next, FIG. 13(b) shows the position information inquiry command 132. The position information inquiry command 132 has a virtual plug specification parameter as parameter 1. On receiving a position information inquiry command 132, the HDD control circuit 12 outputs, as a command response, record/reproduce position information corresponding to the specified virtual plug. The record/reproduce position information shows the AV file set as the record/reproduce object and AV file internal record/reproduce position information.

Next, FIG. 13(c) shows the record command 133. The record command 133 has a virtual plug specification parameter as parameter 1, and a recording mode specification parameter as parameter 2.

On receiving a record command 133, the HDD control circuit 12 records AV data input to the specified virtual plug in the AV file, and in the specified recording mode, starting from the set record/reproduce position of the AV file corresponding to the virtual plug.

When normal recording mode is specified, data is recorded sequentially in the AV file, and the size of the AV file 120 increases progressively as recording proceeds.

In this case, the HDD control circuit 12 stores frame 0 as an offset value in the AV file start position information 115 of the AV file area management table 111. Subsequently, the position of each frame is managed by means of its relative position from the start, with the start of the AV file as frame 0.

When loop recording mode is specified, data is overwrite-recorded sequentially in the AV file, and when the entire AV file has been overwritten, the first data in the AV file is gradually deleted sequentially, and new data is recorded at the end of the AV file. In this case, the HDD control circuit 12 stores the frame number of the first frame of the AV file as an offset value in the AV file start position information 115 of the AV file area management table 111. Subsequently, the position of each frame is managed as an absolute position using serial frame numbers, with the point in time at which loop recording started as frame number 0.

Next, FIG. 13(d) shows the reproduce command 134. The reproduce command 134 has a virtual plug specification parameter as parameter 1. On receiving a reproduce command 134, the HDD control circuit 12 begins reproduce from the set record/reproduce position of the AV file corresponding to the specified virtual plug, and performs output from the specified virtual plug.

Lastly, FIG. 13(e) shows the stop command 135. The stop command 135 has a virtual plug specification parameter as parameter 1. On receiving a stop command 135, the HDD control circuit 12 terminates the recording operation or reproduce operation corresponding to the specified virtual plug.

The case in which loop recording and reproduce are performed simultaneously on the same AV file by an audio visual data recording and reproduce apparatus 10 according to embodiment 3 of the present invention that has the above kind of configuration will be described below with reference to FIG. 14.

Figure 14:
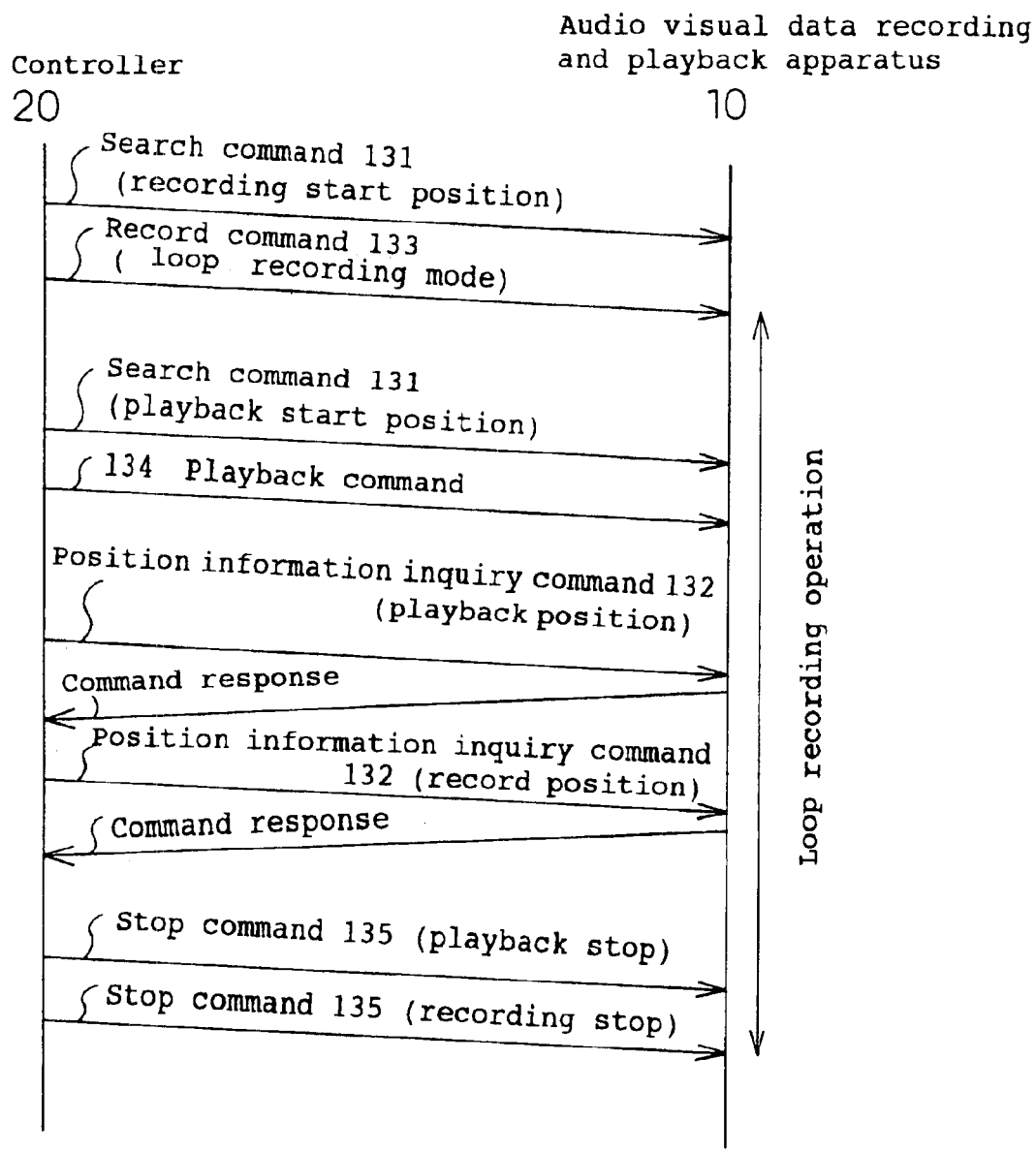
FIG. 14 is a drawing showing a sequence of control commands from a controller 20 to the audio visual data recording and reproduce apparatus 10 when loop recording operation and reproduce operation are performed simultaneously according to embodiment 3 of the present invention.
Figure 19:
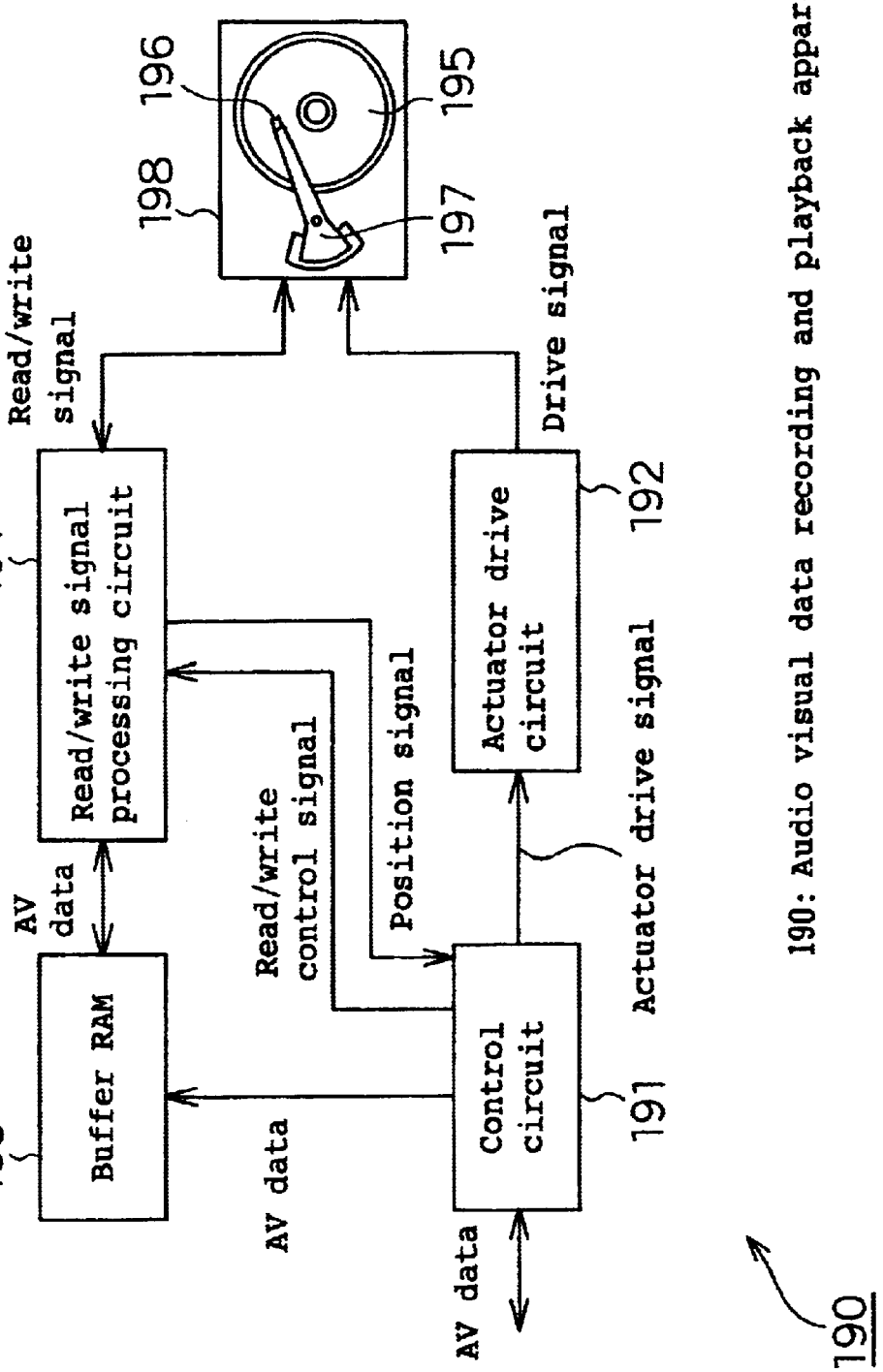
FIG. 19 is a configuration diagram of an audio visual data recording and reproduce apparatus according to the conventional technology.
Figure 20:
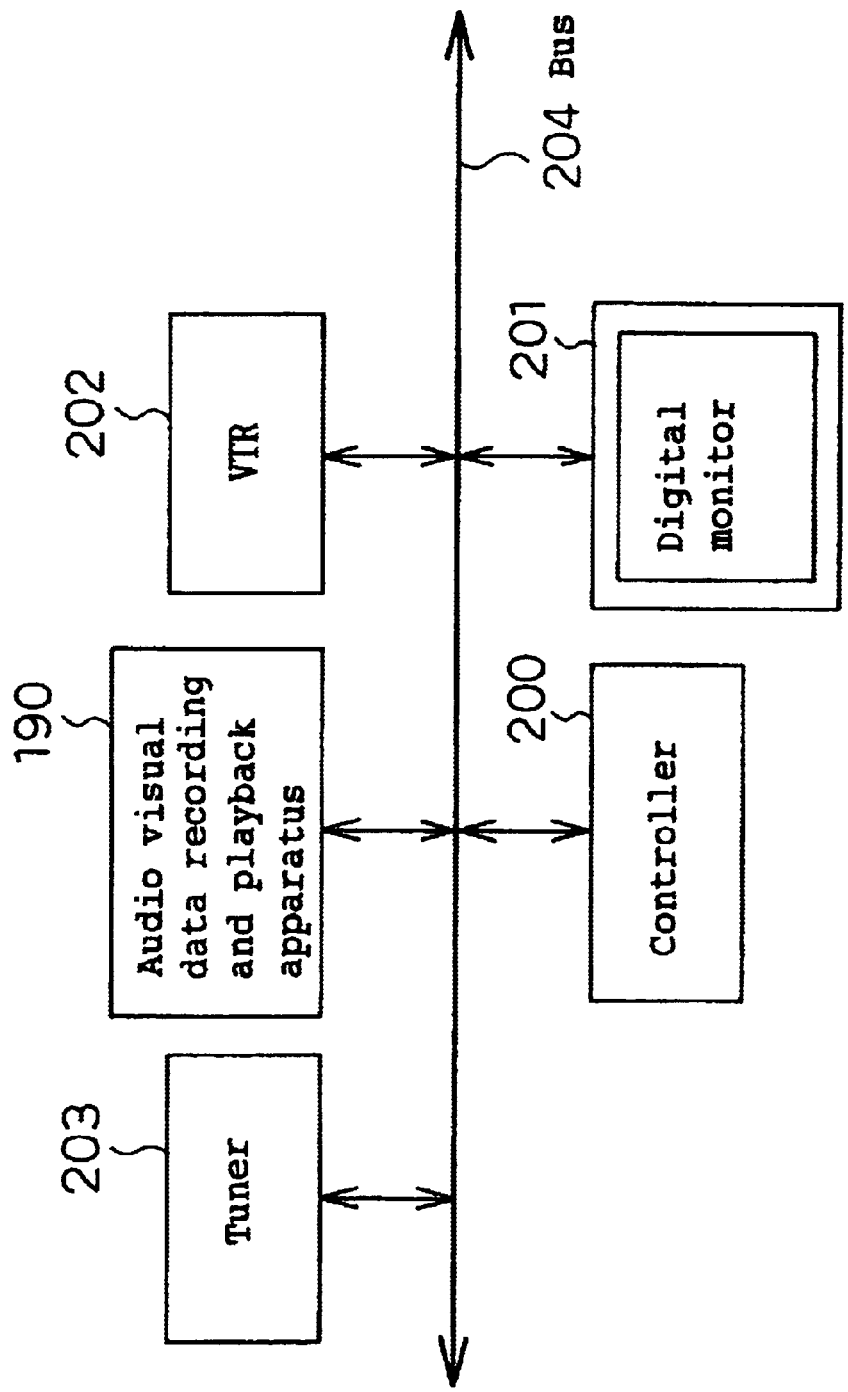
FIG. 20 is a drawing showing the situation in which an audio visual data recording and reproduce apparatus according to the conventional technology configures a system together with other devices.
Figure 21:
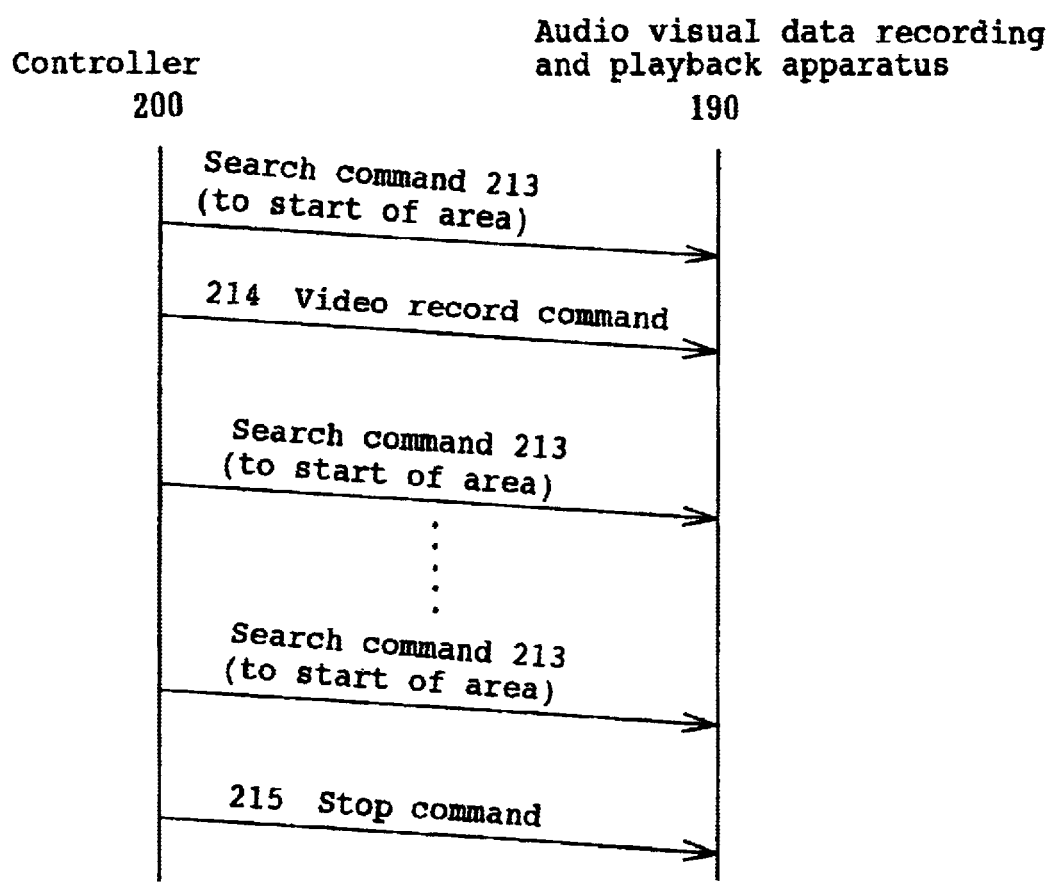
FIG. 21 is a drawing showing the sequence of control commands from a controller 200 to the audio visual data recording and reproduce apparatus 100 when prerecording operation is performed in an audio visual data recording and reproduce apparatus 100 according to the conventional technology.

FIG. 14 is a drawing showing the sequence of control commands from the controller 20 to the audio visual data recording and reproduce apparatus 10 when loop recording operation and reproduce operation are performed simultaneously.

First, the controller 20 issues a search command 131 specifying the virtual input plug and recording start position. When the search command 131 is received by the audio visual data recording and reproduce apparatus 10, the HDD control circuit 12 sets the set recording start position of the AV file 120 specified as the specified virtual input plug record position.

Next, the controller 20 issues a record command 133 specifying the virtual input plug and the loop recording mode. When the record command 133 is received by the audio visual data recording and reproduce apparatus 10, the HDD control circuit 12 begins overwrite recording of the AV data input from the specified virtual plug, starting from the recording start position of the AV file 120 set for the specified virtual output plug.

The above described overwrite recording on the AV file 120 is implemented as repeat overwrite recording in the section from the area start position 123 to the area end position 125 in the data area 121, as shown in FIG. 12(a).

Next, the controller 20 issues a search command 131 specifying the virtual output plug and the reproduce start position. When the search command 132 is received by the audio visual data recording and reproduce apparatus 10, the HDD control circuit 12 sets the set reproduce position of the specified AV file 120 as the specified virtual output plug reproduce position.

Next, the controller 20 issues a reproduce command 134 specifying the virtual output plug to the audio visual data recording and reproduce apparatus 10. On the audio visual data recording and reproduce apparatus 10 side, when the HDD control circuit 12 receives the reproduce command 134, it begins reproduce from the reproduce start position of the AV file 120 set for the specified virtual output plug.

On the hard disk 16, AV file 120 reproduce here consists of playing back the data area 121, as shown in FIG. 12(a).

As repeat overwrite recording has been performed in the data area 121, the AV data is not necessarily recorded in time series form, but since the HDD control circuit 12 performs reproduce as an AV file in which the AV data is arranged along the time axis, as shown in FIG. 12(b), on the basis of area management information in the AV file area management table 111, reproduce can be performed in the same way as in normal reproduce operation.

If it is wished to obtain record position information or reproduce position information during loop recording or during reproduce, the controller 20 issues a position information inquiry command 132 specifying the virtual plug. When the position information inquiry command 132 is received by the audio visual data recording and reproduce apparatus 10, the HDD control circuit 12 outputs record/reproduce position information for the specified virtual plug.

Lastly, when terminating loop recording operation and reproduce operation, the controller 20 issues a stop command 135 specifying the virtual output plug and virtual input plug to the audio visual data recording and reproduce apparatus 10. On the audio visual data recording and reproduce apparatus 10 side, when the HDD control circuit 12 receives the stop command 135, it terminates reproduce operation and recording operation.

Specification/indication of a record position and a reproduce position when loop recording and reproduce are performed simultaneously for the same AV file will be described below with reference to the example shown in FIG. 15.

FIG. 15 is a drawing showing changes in position information in an AV file on which loop recording is performed. FIG. 15(a) shows the input AV data, and FIG. 15(b) through (d) show changes over time in the AV file recorded contents and the position information. In FIG. 15, the AV file size is 7 frames.

FIG. 15(b) shows the AV file recorded contents at the point at which 6 frames have elapsed since the start of recording. The position information corresponding to frame a through frame g recorded in the AV file comprises frame 0 to frame 6. The record position is frame 6. The reproduce position of a reproduce operation started 3 frames after the start of recording is frame 3. Position information 0 is the counter position when repeat mode recording is started, for example.

FIG. 15(c) shows the AV file recorded contents at the point at which 7 frames have elapsed since the start of recording. The position information corresponding to frame b through frame h recorded in the AV file comprises frame 1 to frame 7. The record position is frame 7, and the reproduce position is frame 4.

FIG. 15(d) shows the AV file recorded contents at the point at which 8 frames have elapsed since the start of recording. The position information corresponding to frame c through frame i recorded in the AV file comprises frame 2 to frame 8. The record position is frame 8, and the reproduce position is frame 5.

As described above, according to the present embodiment, position information corresponding to a given frame does not change even during loop recording (to take the example of frame contents c, the position information is always given as 2), and therefore the record position in the AV file on which loop recording is in progress, or the reproduce position when standard speed reproduce is performed on an AV file on which loop recording is in progress, is incremented sequentially in the same way as in recording/reproduce of a normal AV file. As a result, even with an AV file being recorded in loop recording mode, the status of the recording/reproduce operation can be judged according to changes in the recording/reproduce position information in the same way as in recording/reproduce of a normal AV file.

Also, since an AV file can be accessed by specifying an absolute position, it is possible to access AV data in an AV file accurately in frame units.

Moreover, the reproduce position and record position can be managed by the controller 20 in the same way as in normal recording and reproduce, using position information obtained by means of a position information inquiry command.

(Embodiment 4)

The configuration of the audio visual data recording and reproduce apparatus in the present embodiment is identical to the configuration of the audio visual data recording and reproduce apparatus in embodiments 1 through 3 shown in FIG. 1.

Also, the configuration of the AV file area management table and the corresponding command set in the present embodiment are identical to those in embodiment 3, and the corresponding explanatory drawings are also identical.

The difference between the operation of the audio visual data recording and reproduce apparatus in the present embodiment, and that of embodiment 3, lies in the position information management method.

The position information management method in the present embodiment will be described below with reference to FIG. 16.

FIG. 16 is a drawing showing changes in position information in an AV file on which loop recording is performed, and position information after recording/reproduce operation on the AV file has ended.

When an audio visual data recording and reproduce apparatus 10 in the present embodiment receives a record command 133 specifying the virtual input plug and the loop recording mode, the HDD control circuit 12 begins overwrite recording of the AV data input from the specified virtual input plug, starting from the recording start position of the AV file 120 set for the specified virtual output plug.

When recording operation using loop recording mode is started, the HDD control circuit 12 stores the frame number of the first frame of the AV file as an offset value in the AV file start position information 115 of the AV file area management table 111, and updates this value sequentially.

By this means, the HDD control circuit 12 can perform management using serial frame numbers, with the point in time at which loop recording started as frame number 0, as absolute position information for each frame.

Changes in the position information in an AV file on which loop recording is performed are the same as those in embodiment 3, and are shown in FIGS. 16(b) and (c).

When terminating loop recording operation and reproduce operation, the controller 20 issues a stop command 135 specifying the virtual output plug and virtual input plug to the audio visual data recording and reproduce apparatus 10. On the audio visual data recording and reproduce apparatus 10 side, when the HDD control circuit 12 receives the stop command 135, it terminates reproduce operation and recording operation.

When loop recording operation and reproduce operation on the AV file end, the HDD control circuit 12 switches the position information management method. That is to say, the HDD control circuit 12 rewrites the AV file start position information 115 of the AV file area management table 111 to frame 0 as an offset value. Subsequently, the position information of each frame is managed by the number of relative frames from the start, with the start of the AV file as frame 0.

FIG. 16(c) shows the correspondence between each frame in the AV file and the position information after loop recording operation and reproduce operation for the AV file have ended. As shown in the figure, frame b through frame h in the AV file correspond to position information frame 0 through frame 6.

As described above, according to the present embodiment, in loop recording operation, the position of each frame is managed as absolute position information using serial frame numbers, with the point in time at which loop recording started as frame number 0, and when loop recording operation and reproduce operation for the AV file end, the position information for each frame is managed by the relative number of frames from the start of the AV file, with the result that, even if an AV file is recorded in loop recording mode, the position of each frame can be managed by its relative position in the AV file in the same way as for an AV file recorded in the normal recording mode.

(Embodiment 5)

The configuration of the audio visual data recording and reproduce apparatus in the present embodiment is identical to the configuration of the audio visual data recording and reproduce apparatus in embodiments 1 through 4 shown in FIG. 1.

The difference between the operation of the audio visual data recording and reproduce apparatus in the present embodiment, and the operation of the audio visual data recording and reproduce apparatus according to embodiments 3 and 4, lies in the position information management method.

The position information management method in the present embodiment will be described below with reference to FIG. 17 and FIG. 18.

FIG. 17 is a drawing showing changes in the correspondence between each frame in the AV file and position information when loop recording is interrupted. FIG. 17(a) is a drawing showing the input AV data and the timing of the recording start and recording stop, and FIGS. 17(b) and (c) are drawings showing the correspondence between each frame in the AV file and the position information.

FIG. 18 is a drawing showing the configuration of the AV file area management table in the present embodiment. The AV file area management table 181 in the present embodiment differs from the AV file area management table in the other embodiments in that it has a start position address, size, and start position information for each segment in the AV file. As the number of segments changes dynamically, the size of the AV file area management table 181 of the present embodiment varies dynamically.

When the audio visual data recording and reproduce apparatus 10 in the present embodiment receives a record command 133 specifying loop recording mode, the HDD control circuit 12 begins overwrite recording of the AV data input from the specified virtual input plug. At this time, the HDD control circuit 12 stores frame 0 as an offset value in the segment #0 start position information 182 of the AV file area management table 181. Therefore, frames 0, 1, and 2 are assigned correspondence to input frames a, b, and c, with serial numbers, as position information. A segment corresponds to one unit from the start of recording until recording stops.

When, after recording frame a through frame d, the audio visual data recording and reproduce apparatus 10 receives a stop command 135 for stopping the recording operation, the HDD control circuit 12 stops the recording operation.

Also, when the audio visual data recording and reproduce apparatus 10 again receives a record command 133 specifying loop recording mode, the HDD control circuit 12 restarts sequential overwrite recording of frames g, h, and i, starting after the previous recording stop position, frame d.

At this time, the HDD control circuit 12 creates a new segment #1 with the post-restart recorded frame as the constituent data, and stores segment #1 management information in the AV file area management table 181. In the segment #1 start position information 183, frame 4—the frame number following the last frame of segment #0 (frame 3)—is recorded as the frame number of the segment #1 start frame. Subsequently, frames 4, 5, and 6 are assigned correspondence to input frames g, h, and i, with serial numbers, as position information.

When 3 frames are overwrite-recorded from resumption of loop recording operation, the entire AV file is overwritten as shown in FIG. 17(b). From this point on, the same kind of loop recording operations as in the other embodiments are executed consecutively, in which the first frame is deleted and a new frame is added at the end.

At this time, the HDD control circuit 12 rewrites the segment #0 start frame number sequentially and stores it in the segment #0 start position information 182 of the AV file area management table 181. The segment #1 start position information 183 does not vary over time.

In the present embodiment, the AV file has a segment structure, with the structure changing as loop recording operation proceeds. As loop recording operation proceeds, the size of segment #0 decreases and the size of segment #1 increases, as shown in FIGS. 17(b) and (c). When loop recording continues for a certain time, the original segment #0 disappears, and the original segment #1 becomes the new segment #0 instead.

As described above, in an audio visual data recording and reproduce apparatus according to the present embodiment, when loop recording operation is interrupted, a new segment is created. Also, position information corresponding to individual frames in the AV file is managed by means of serial numbers following the position information immediately before interruption of loop recording operation.

By this means, AV data recorded from the start of recording until recording stops can be managed as the respective individual segments. In addition, it is possible to manage the position of each frame, for the AV file as a whole, according to absolute positions assigned consecutively with serial numbers. Segment numbers also have absolute positions.

Moreover, in the present embodiment, the case where loop recording operation is interrupted only once has been described, but it is clear that multiple interruptions of loop recording operation can also be handled. In this case, a new segment is created each time recording operation is interrupted.

Further, in each embodiment, a frame has been taken to be an AV file internal access unit, but the access unit is not limited to a frame, and another access unit can also be used.

By each of the means explained in the above described embodiments 3 through 5, with the audio visual data recording and reproduce apparatus of the present invention, reproduce position information and record position information increases sequentially as in normal recording and reproduce, even during recording in loop recording mode. Also, since an AV file can be accessed by specifying an absolute position, it is possible to access AV data in an AV file accurately in frame units.

Moreover, the reproduce position and record position can be managed by the controller in the same way as in normal recording and reproduce, using position information obtained by means of a position information inquiry command.

Further, when loop recording operation and reproduce operation for an AV file end, the position information for each frame is managed by the relative number of frames from the start of the AV file, so that management by relative position in the AV file is possible even if an AV file is repeat-recorded.

Moreover, AV data recorded from the start of recording until recording stops can be managed as individual segments, and the position of each frame can be managed by means of the absolute position given by a serial number in the entire AV file.

Also, in each of the above described embodiments, the audio visual data recording apparatus and audio visual data reproduce apparatus are described as an integrated audio visual data recording and reproduce apparatus, but these two may also be independent entities.

Further, in each of the embodiments, data including video and audio is handled as AV data, but it is, of course, also possible to handle video data alone, or audio data alone.

Also, in each of the embodiments, the operation of the interface circuit 11 and the HDD control circuit 12 is implemented by hardware, but this may also be implemented by software by means of program operation using a computer.

Further, in each of the embodiments, the operation of the interface circuit 11 and the HDD control circuit 12 may also be implemented in the form of a program using a computer, recorded on a program recording medium.

INDUSTRIAL APPLICABILITY

As described above, according to the audio visual data recording and reproduce apparatus of the present invention, it is possible for the user to set up a prescribed area, that can be set arbitrarily, in a recording area, and for recording operations to be controlled, and repeat overwrite recording such as prerecording to be performed.

Further, with the audio visual data recording and reproduce apparatus of the present invention, reproduce position information and record position information increases sequentially as in normal recording and reproduce, even during recording in loop recording mode. Also, since an AV file can be accessed by specifying an absolute position, it is possible to access AV data in an AV file accurately in frame units.

What is claimed is:

1. An audio visual data recording apparatus, comprising:
a recording medium for recording video and/or audio data;
recording area recording means for performing recording of video and/or audio data in a recording area in said recording medium;
command receiving means for receiving control commands from a device connected via a bus; and
AV file management means for setting, when a command that creates an AV file is received by said command receiving means, an AV file management table containing correspondence information between a recording area of said recording medium and the AV file, and for creating an AV file of a size that is set by the command and that a user may arbitrarily set, wherein said recording area recording means performs recording of video and/or audio data by repeated overwriting in said recording area on the basis of said AV file management table, and wherein said AV file management means stores data placement information on the recording area that has been repeatedly overwritten in the AV file management table.

2. The audio visual data recording apparatus according to claim 1, wherein:

said command receiving means receives an additional recording instruction command that performs an additional recording operation on said AV file, and said recording area recording means performs, on reception of said additional recording instruction command, recording of video and/or audio data in a recording area different from said repeatedly overwritten recording area.

3. An audio visual data recording apparatus, comprising:

a recording medium that records video and/or audio data;

recording area recording means for performing recording of video and/or audio data in a recording area in said recording medium;

command receiving means for receiving control commands for a device connected via a bus;

AV file maximum size setting means for setting, when a maximum size setting command that stipulates a maximum size of an AV file is received by said command receiving means, said maximum size in an AV file management table, and AV file management means for managing said AV file on the basis of at least the AV file maximum size within said AV file management table, wherein said recording area recording means performs recording of video and/or audio data in said recording area on the basis of said AV file management table.

4. The audio visual data recording apparatus according to claim 3, wherein said recording area recording means performs recording of video and/or audio data by repeated overwriting in said a recording area corresponding to said AV file on the basis of the AV file maximum size in said AV file management table.

5. The audio visual data recording apparatus according to claim 4, wherein said AV file maximum size setting means re-sets, on reception of a new maximum size setting command by said command receiving means during a recording operation, the maximum size in the AV file management table; and said recording area recording means performs recording of video and/or audio data in said recording area by switching operations on the basis of said re-set AV file management table.

6. The audio visual data recording apparatus according to claim 3, wherein a file size of said AV file for which a maximum size has been set is variable up to the ceiling of said set maximum size and is a size of an area in which data are actually recorded.

7. The audio visual data recording apparatus according to claim 4, wherein a file size of said AV file for which a maximum size has been set is variable up to the ceiling of said set maximum size and is a size of an area in which data are actually recorded.

8. The audio visual data recording apparatus according to claim 5, wherein a file size of said AV file for which a maximum size has been set is variable up to the ceiling of said set maximum size and a size of an area in which data are actually recorded.

9. An audio visual data reproduce apparatus, comprising:

a recording medium for recording video and/or audio data;

AV file management means for managing an AV file management table containing correspondence information between a recording area of said recording medium and an AV file;

command receiving means for receiving control commands from a device connected via a bus; and reproduce means for receiving said control commands and reproducing video and/or audio data recorded by the audio visual data recording apparatus according to any one of claims 1, 2 through 5 and 6–8, wherein said command receiving means receives a reproduce instruction command for performing a reproduce operation on AV file data; and said reproduce means performs, on reception of said reproduce instruction command, reproduce of video and/or audio data from said recording area on the basis of said AV file management table.

10. The audio visual data reproduce apparatus according to claim 9, wherein said reproduce means reproduces, when there is an unrecorded area, which is an area in which video and/or audio data has not been recorded, in said recording area, an amount of alternate data corresponding to the amount of data in that recording area.

11. The audio visual data reproduce apparatus according to claim 9, wherein said reproduce means stops, when there is an unrecorded area, which is an area in which video and/or audio data is not recorded, in said recording area, reproduce of video and/or audio data from said recording area.

12. The audio visual data reproduce apparatus according to claim 9, wherein said reproduce means reproduces data recorded in said recording area, in order from the oldest data recorded.

13. An audio visual data recording method using:

a recording medium that records video and/or audio data;

recording area recording means for performing recording of video and/or audio data in a recording area in said recording medium; and command receiving means for receiving control commands from a device connected via a bus;

said method comprising:

performing, by using an AV file management means for setting, when a command that creates an AV (audio visual) file is received by said command receiving means, an AV file management table containing correspondence information between a recording area of said recording medium recording areas and the AV file, and for creating an AV file of a size that is set by the command and that a user may arbitrarily set and by using said recording area recording means, recording of video and/or audio data in said recording area on the basis of said AV file management table.

14. An audio visual data reproduce method using:

a recording medium that records video and/or audio data;

AV file management means for managing an AV file management table containing correspondence information between a recording area of said recording medium and an AV file;

command receiving means for receiving control commands from a device connected via a bus; and reproduce means for receiving said control command and reproducing video and/or audio data recorded by the audio visual data recording method according to claim 13, said audio visual data reproduce method comprising:

receiving a reproduce instruction command that performs a reproduce operation on AV file data by using said command receiving means; and performing reproduce of video and/or audio data from said recording area on the basis of said AV file management table by using said reproduce means on reception of said reproduce instruction command.

15. A program recording medium wherein said medium records a program for executing on a computer the functions of said command receiving means and said AV file management means of the audio visual data recording apparatus according to any one of claims 1 and 2 through 5.

16. A program recording medium wherein said medium records a program for executing on a computer the functions of of said command receiving means and said AV file management means of the audio visual data reproduce apparatus according to claim 9.

17. A program recording medium wherein said medium records a program for executing on a computer operations of said command receiving means and said AV file management means of the audio visual data recording method according to claim 13.

18. A program recording medium wherein said medium records a program for executing on a computer operations of said command receiving means and said AV file management means of the audio visual data reproduce method according to claim 14.

* * * * *